US008056922B2

(12) United States Patent
Mitsuo et al.

(10) Patent No.: US 8,056,922 B2
(45) Date of Patent: Nov. 15, 2011

(54) COLUMN-MOUNTED KNEE AIRBAG DEVICE

(75) Inventors: Tetsu Mitsuo, Nisshin (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/722,239

(22) Filed: Mar. 11, 2010

(65) Prior Publication Data

US 2010/0164206 A1    Jul. 1, 2010

Related U.S. Application Data

(63) Continuation of application No. PCT/JP2009/055349, filed on Mar. 18, 2009.

(30) Foreign Application Priority Data

Sep. 11, 2008   (JP) .................................. 2008-233133

(51) Int. Cl.
*B60R 21/206* (2011.01)

(52) U.S. Cl. .................... 280/728.2; 280/730.1; 280/731

(58) Field of Classification Search ............... 280/730.1, 280/731, 732, 728.2
See application file for complete search history.

(56) References Cited

U.S. PATENT DOCUMENTS

| 5,570,901 | A  * | 11/1996 | Fyrainer .................... 280/730.1 |
| 7,182,365 | B2 * | 2/2007  | Takimoto et al. ........... 280/730.1 |
| 7,681,908 | B2 * | 3/2010  | Fukawatase et al. ...... 280/728.3 |
| 7,708,310 | B2 * | 5/2010  | Adachi et al. ................. 280/731 |
| 7,722,076 | B2 * | 5/2010  | Fukawatase et al. ...... 280/730.1 |
| 7,753,403 | B2 * | 7/2010  | Fukawatase et al. ...... 280/730.1 |
| 2008/0100042 | A1 * | 5/2008 | Adachi et al. .............. 280/730.1 |
| 2008/0174091 | A1 * | 7/2008 | Hoshino et al. ............ 280/728.3 |
| 2008/0217890 | A1 * | 9/2008 | Fukawatase et al. ......... 280/731 |
| 2010/0052295 | A1 * | 3/2010 | Fukawatase et al. ...... 280/730.1 |
| 2010/0096841 | A1 * | 4/2010 | Tanaka et al. .............. 280/730.1 |

FOREIGN PATENT DOCUMENTS

DE         10250405  A1  *  5/2003
(Continued)

OTHER PUBLICATIONS

Zischka et al., Knee restraint system for driver of vehicle, comprising airbag and gas generator integrated in steering column, May 15, 2003, EPO, DE 10 50 405 Al, Machine Translation of Description.*

(Continued)

*Primary Examiner* — Toan C To
*Assistant Examiner* — James English
(74) *Attorney, Agent, or Firm* — Oliff & Berridge, PLC

(57) ABSTRACT

The invention has the object of increasing workability of an attachment operation of a knee airbag module of a column-mounted knee airbag device. When fixing a knee airbag module to a lower portion outer peripheral surface of a steering column, it is possible to perform the fixing from a vehicle upper side and a vehicle rear side of the steering column, using a space between an instrument panel (interior member) at a vehicle upper side of the steering column and a combination switch provided at a rear end side of the steering column. Accordingly, when performing an attachment operation of the knee airbag module to the steering column, an operator does not have to enter from a lower side of the steering column.

10 Claims, 15 Drawing Sheets

FOREIGN PATENT DOCUMENTS

| | | | |
|---|---|---|---|
| JP | A-8-188105 | | 7/1996 |
| JP | 2002037003 A | * | 2/2002 |
| JP | A-2007-196734 | | 8/2007 |
| JP | A-2008-114609 | | 5/2008 |
| JP | A-2008-126735 | | 6/2008 |
| JP | A-2008-126736 | | 6/2008 |
| JP | A-2008-126996 | | 6/2008 |
| JP | A-2008-174086 | | 7/2008 |
| JP | A-2008-213591 | | 9/2008 |
| JP | A-2008-222113 | | 9/2008 |
| JP | A-2008-279589 | | 11/2008 |
| JP | A-2009-184469 | | 8/2009 |

OTHER PUBLICATIONS

Takimoto et al., Air Bag Device for Protecting Knee, Jul. 21, 2000, JPO, JP 2002-037003 A, Machine Translation of Description.*
Fukawatase et al., Knee Airbag Device with Column, Jun. 5, 2008, JPO, JP-2008-126735 A, Machine Translation of Description.*

* cited by examiner

FIG.1
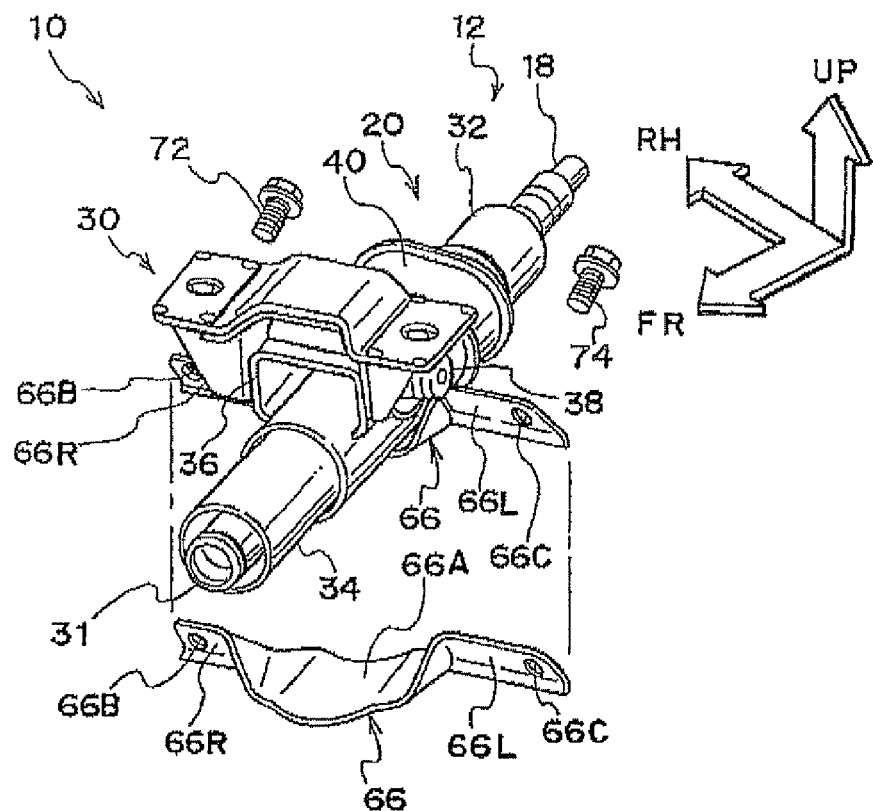
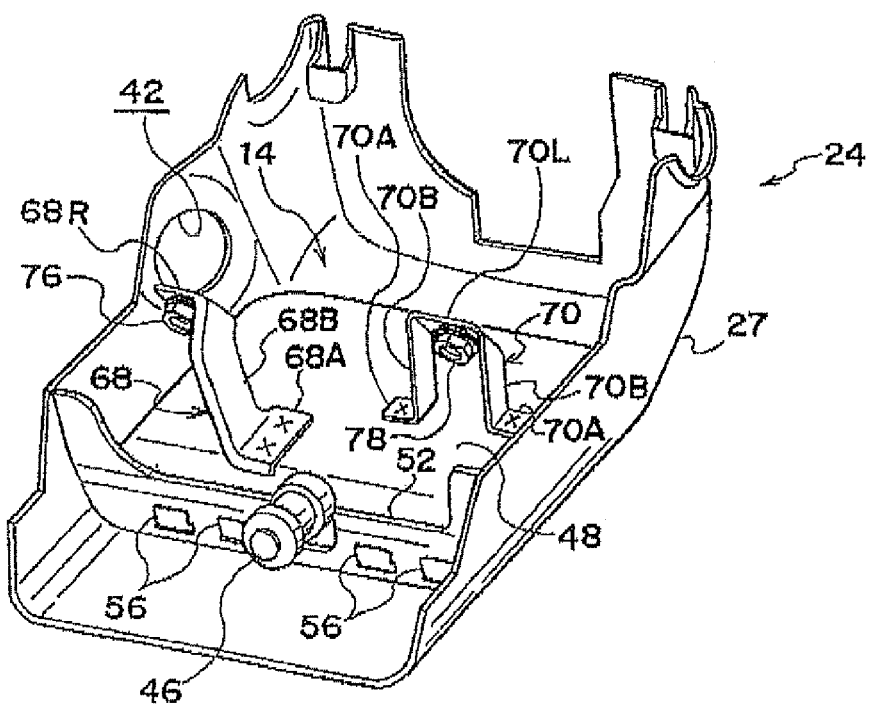

COLUMN-MOUNTED KNEE AIRBAG DEVICE

This is a Continuation of International Application No. PCT/JP2009/055349 filed Mar. 18, 2009, which claims the benefit of Japanese Patent Application No. 2008-233133 filed Sep. 11, 2008. The disclosure of the prior applications is hereby incorporated by reference herein in its entirety.

TECHNICAL FIELD

The present invention relates to a column-mounted knee airbag device.

BACKGROUND ART

A column-mounted knee airbag device is known in which a knee airbag module is fixed to a steering column from a vehicle lower side via an attachment bracket (see Patent Document 1).
Patent Document 1: Japanese Patent Application Laid-Open (JP-A) No. 2008-114609

DESCRIPTION OF THE INVENTION

Problem to be Solved by the Invention

However, in the above prior art, when performing an attachment operation of the knee airbag module to the steering column, it is necessary for the person performing the operation to approach from a lower side of the steering column, and therefore there is room for improvement with respect to attachability.

The present invention considers the above facts, and it is an object thereof to improve the attachability of a knee airbag module in a column-mounted knee airbag device.

Means for Solving the Problem

The first aspect of the present invention is a column-mounted knee airbag device, including, in a column cover that covers a rear end side of a steering column, a knee airbag module fixed to a lower portion outer peripheral surface of the steering column and including a knee airbag in a folded state and an inflator that can supply gas to the knee airbag, assembled in a module case, in which, when fixing the knee airbag module to a lower portion outer peripheral surface of the steering column, it is possible to perform the fixing from a vehicle upper side and a vehicle rear side of the steering column, using a space between an interior member at a vehicle upper side of the steering column and a combination switch provided at a rear end side of the steering column.

In the column-mounted knee airbag device according to the first aspect, when a knee airbag module is fixed to a lower portion outer peripheral surface side of a steering column, the knee airbag module is configured to be fixed from a vehicle upper side and a vehicle rear side of the steering column, using a space between an interior member at a vehicle upper site of the steering column, and a combination switch, which is provided at a rear end side of the steering column. Therefore, when performing an attachment operation of the knee airbag module to the steering column, there is no need for an operator to enter from a lower side of the steering column. As a result, it is possible to improve the workability of the attachment operation of the knee airbag module to the steering column.

The second aspect of the present invention is the first aspect, in which the column cover has a multi-part structure including a vehicle upper side upper cover and a vehicle lower side lower cover, and the knee airbag module is attached to the lower cover before fixing to the steering column.

In the column-mounted knee airbag device according to the second aspect, before a knee airbag module is fixed to a steering column, the knee airbag module is attached to a lower cover of a column cover, and thereby the attachment of each of the lower cover and the knee airbag module to the steering column can be performed at the same time. As a result, when attaching the lower cover, there is no need for an operator to enter from a lower side of the steering column, and thereby the workability of an attachment operation of the lower cover can be improved.

The third aspect of the present invention is any one of the first aspect or the second aspect, in which one of an upper attachment bracket or a lower attachment bracket is provided at a steering column side; the other of the upper attachment bracket or the lower attachment bracket is provided at a knee airbag module side; in the fixing of the knee airbag module to the steering column, the upper attachment bracket and the lower attachment bracket are fixed to each other at corresponding fastening surfaces thereof, and the fastening surface of the lower attachment bracket inclines towards a vehicle upper side and a vehicle rear side with respect to an axis line of the steering column.

In the column-mounted knee airbag device according to the third aspect, the fixing of a knee airbag module to a steering column is such that an upper attachment bracket and a lower attachment bracket are fastened at corresponding fastening surfaces thereof. Further, since a fastening surface of a lower attachment bracket is inclined towards a vehicle upper side and a vehicle rear side with, respect to an axis line of the steering column, an operation of fixing a knee airbag module at a lower portion outer peripheral surface of a steering column can be easily performed from a vehicle upper side and a vehicle rear side of the steering column. Thereby, the workability of an attachment operation of a knee airbag module can be further improved.

The fourth aspect of the present invention is the column-mounted knee airbag device of the third aspect, in which the steering column includes a vehicle rear side portion to which the knee airbag module is fixed, and a vehicle front side portion, and is configured to be able to collapse and absorb an impact, owing to the vehicle rear side portion and the vehicle front side portion moving relative to each other in an axial direction when a load equal to or greater than a predetermined load is input thereto along the axial direction of the steering column, and the upper attachment bracket and the lower attachment bracket are disposed between the combination switch and the vehicle front side portion such that they do not interfere with the vehicle front side portion during the relative movement.

In the column-mounted knee airbag device of the fourth aspect, when a load greater equal to or greater than a predetermined value is input along an axis line direction of a steering column, and a vehicle rear side portion and a vehicle front side portion move relative to each other along the axis line direction and the steering column collapses, since an upper attachment bracket and a lower attachment bracket are provided between a combination switch and a vehicle front side portion such that they do not interfere with a vehicle front side portion, the relative movement of the vehicle rear side portion and the vehicle front side portion of the steering column can be performed smoothly. As a result, an impact absorbing performance of a steering column can be improved.

The fifth aspect of the present invention is the column-mounted knee airbag device of the fourth aspect, in which the upper attachment bracket and the lower attachment bracket are provided at a vehicle width direction outer side of the steering column, such that they do not interfere with the vehicle front side portion, when the vehicle front side portion and the vehicle rear side portion move relative to each other and the steering column completely collapses.

In the column-mounted knee airbag device according to the fifth aspect of the present invention, an upper attachment bracket and a lower attachment bracket are arranged at an outer side in a vehicle width direction of a steering column, such that they do not interfere with a vehicle front side portion when a vehicle rear side portion and the vehicle front side portion move relative to each other and the steering column completely collapses. As a result, an impact absorbing stroke of the steering column can be ensured, and it is possible to reduce a dimension of the steering column in the direction of an axis line, and thereby the degree of freedom when mounting the steering column to a vehicle may be increased.

The sixth aspect of the present invention is the column-mounted knee airbag device of the fourth aspect or the fifth aspect, in which the upper attachment bracket is provided at a knee airbag module side; the lower attachment bracket is provided at the vehicle rear side portion of the steering column; and a engaging portion is provided at the upper attachment bracket and is capable of engaging with the lower attachment bracket when the fastening surface of the upper attachment bracket is superimposed on the fastening surface of the lower attachment bracket.

In the column-mounted knee airbag device according to the sixth aspect of the present invention, an upper attachment bracket is provided at a knee airbag module side, a lower attachment bracket is provided ala vehicle rear side portion of a steering column, and an engaging portion, that can engage with the lower attachment bracket when the fastening surface of the upper attachment bracket is superimposed on the fastening surface of the lower attachment bracket, is formed at the upper attachment bracket. Thereby, when the knee airbag module is attached to the steering column, owing to the engaging portion of the upper attachment bracket engaging with the lower attachment bracket, it is possible to temporarily place the knee airbag module. As a result, the knee airbag module can be attached using only one hand, and the workability of the operation of attaching the knee airbag module to the steering column can be greatly improved.

The seventh aspect of the present invention is the column-mounted knee airbag device of any one of the first aspect to the sixth aspect, in which the inflator is provided at a vehicle lower side of the steering column, along a direction that is at a right angle, or substantially at a right angle, to an axis line of the steering column.

In the column-mounted knee airbag device according to the seventh aspect of the present invention, an inflator is disposed at a vehicle lower side with respect to a steering column, along a direction that intersects an axis line of the steering column at a right angle or substantially a right angle. Thereby, it is possible to ensure a greater collapsing stroke of the steering column for absorbing an impact.

The eighth aspect of the present invention is the column-mounted knee airbag device of the seventh aspect, in which the inflator is arranged in the module case at a position offset towards a vehicle rear direction side.

In the column-mounted knee airbag device according to the eighth aspect of the present invention, an inflator is arranged in a module case at a position offset towards a vehicle rear direction side. Thereby, it is possible to ensure a greater collapsing stroke of the steering column for absorbing an impact.

The ninth aspect of the present invention is the column mounted knee airbag device of any one of the first aspect to the third aspect, in which the inflator is arranged directly under, or substantially directly under, the steering column, in parallel, or substantially in parallel, with an axis line of the steering column.

In the column-mounted knee airbag device according to the ninth aspect of the present invention, an inflator is arranged directly under, or substantially directly under, a steering column, in parallel, or substantially in parallel, with an axis line of the steering column. Thereby, it is possible to easily avoid interference between an inflator and other parts provided in a column cover. As a result, it is possible to effectively use a limited space within the column cover.

The tenth aspect of the present invention is the column-mounted knee airbag device of any one of the first aspect to the third aspect, in which a lower attachment bracket at a vehicle right side is offset further towards a front side in an axis line direction of the steering column than a lower attachment bracket at a vehicle left side.

In the column-mounted knee airbag device according to the tenth aspect of the present invention, a lower attachment bracket at a vehicle right side is offset further towards a front side in an axis line direction of a steering column than a lower attachment bracket at a vehicle left side. Thereby, it is possible to avoid interference with a lock device provided at a side portion of a vehicle right side of the steering column.

Effect of the Invention

As described above, the column-mounted knee airbag device according to the first aspect of the present invention has the advantageous effect of improving the workability of an attachment operation of a knee airbag module in a column-mounted knee airbag device.

The column-mounted knee airbag device of the second aspect has the advantageous effect of improving the workability of an attachment operation of a lower cover.

The column-mounted knee airbag device of the third aspect has the advantageous effect of further improving the workability of an attachment operation of a knee airbag module.

The column-mounted knee airbag device of the fourth aspect has the advantageous effect of improving a shock absorbing performance of a steering column.

The column-mounted knee airbag device of the fifth aspect has the advantageous effect of increasing freedom when mounting a steering column to a vehicle.

The column-mounted knee airbag device of the sixth aspect has the advantageous effect of greatly improving the workability of an attachment operation of a knee airbag module to a steering column.

The column-mounted knee airbag device of the seventh aspect has the advantageous effect of ensuring a greater collapsing stroke of the steering column for absorbing an impact.

The column-mounted knee airbag device of the eighth aspect has the advantageous effect of ensuring an even greater collapsing stroke of the steering column for absorbing an impact.

The column-mounted knee airbag device of the ninth aspect has the advantageous effect of effectively using a limited space within the column cover.

The column-mounted knee airbag device of the tenth aspect has the advantageous effect of avoiding interference with a lock device provided at a side portion of a vehicle right side of the steering column.

BRIEF DESCRIPTION OF THE DRAWINGS

FIGS. 1-3 relate to the first embodiment.

FIG. 1 is an exploded perspective view showing a column-mounted knee airbag device.

FIG. 2 is a sectional view showing a state in which, in a column-mounted knee airbag device, when performing an attachment operation of a knee airbag module to a steering column, a fastening tool is inserted from a vehicle upper side and a vehicle rear side of the steering column.

FIG. 3 is a schematic view showing a state in which, when a knee portion of a vehicle occupant is restricted by an expanded and deployed knee airbag, a force input from the knee portion to the knee airbag is received by an instrument panel, and a fastening surface of an upper attachment bracket and a lower attachment bracket.

FIG. 4 is a sectional view showing a state in which, in a column-mounted knee airbag device, when performing an attachment operation of a knee airbag module to a steering column, a fastening tool is inserted from a vehicle upper side and vehicle rear side of the steering column.

FIG. 5 is an enlarged sectional view showing a fastening region of a knee Airbag module with an upper attachment bracket and a lower attachment bracket.

FIG. 6 is a plan view showing that, in a column-mounted knee airbag device, even if a steering column completely collapses in order to absorb an impact, an upper attachment bracket and a lower attachment bracket do not interfere with a vehicle front side portion.

FIG. 7 is an exploded perspective view showing a state before a knee airbag module is attached to a steering column.

FIG. 8 is an enlarged perspective view showing the upper attachment bracket and lower attachment bracket, and a bolt, in the state shown in FIG. 7.

FIG. 9 is an enlarged sectional view showing an upper attachment bracket, a lower attachment bracket, a bolt and a nut in the state shown in FIG. 7.

FIG. 10 is an exploded perspective view showing a state in which a knee airbag module is temporarily placed at a steering column.

FIG. 11 is an enlarged perspective view showing an upper attachment bracket, a lower attachment bracket, and a bolt in the state shown in FIG. 10.

FIG. 12 is an enlarged sectional view showing an upper attachment bracket, a lower attachment bracket, a bolt and a nut in the state shown in FIG. 10.

FIG. 13 is a perspective view showing a state in which a knee airbag module is attached to a steering column.

FIG. 14 is an enlarged perspective view showing an upper attachment bracket, a lower attachment bracket, and a bolt in the state shown in FIG. 13.

FIG. 15 is an enlarged sectional view showing an upper attachment bracket, a lower attachment bracket, a bolt and a nut in the state shown in FIG. 13.

BEST MODE FOR IMPLEMENTING THE INVENTION

Embodiments of the present invention are explained below with reference to the drawings.

First Embodiment

Figure 2:
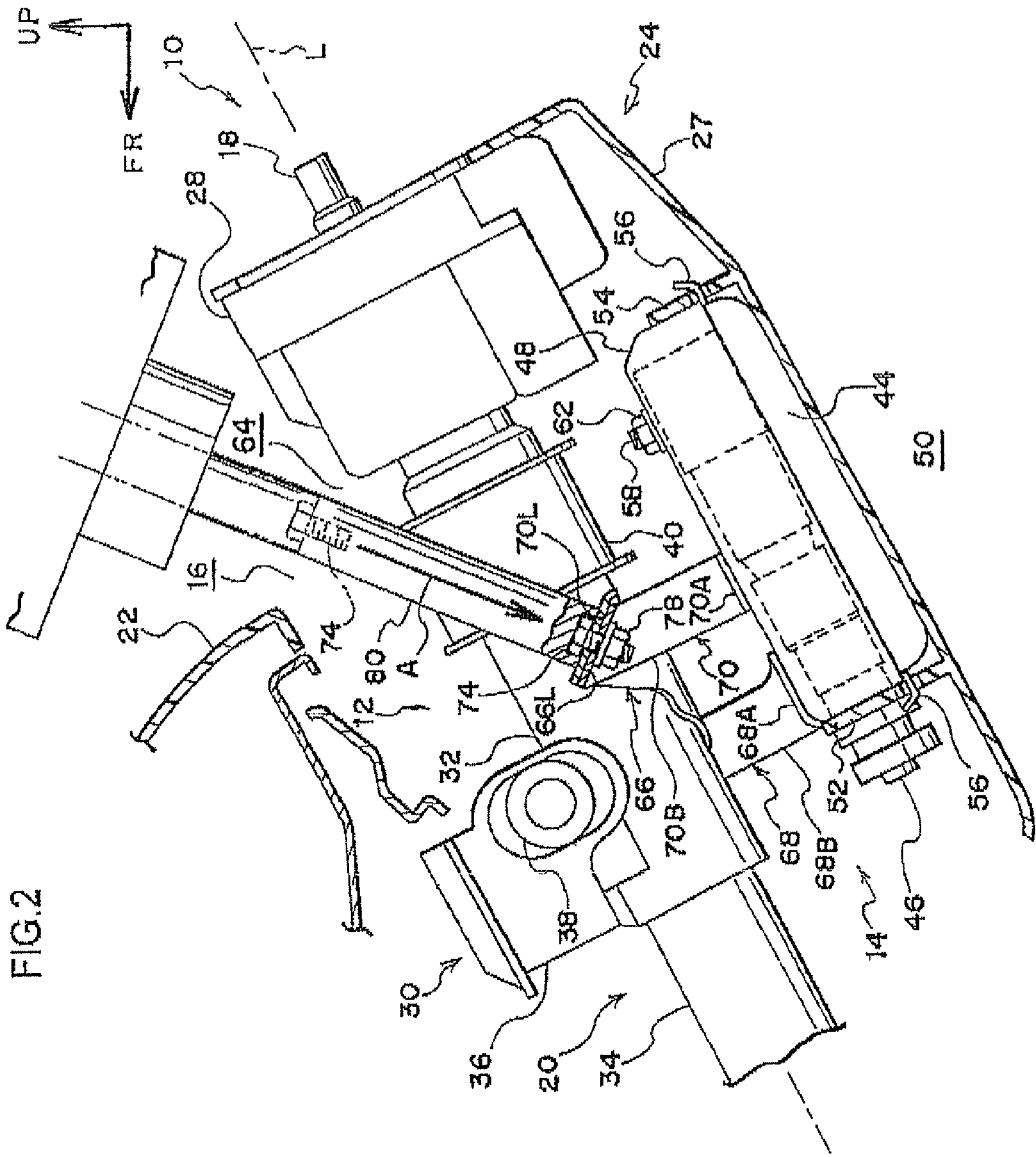

As shown in FIGS. 1 and 2, a column-mounted knee airbag device 10 according to the present embodiment has a knee airbag module 14 fixed at a lower portion outer peripheral surface side of a steering column 12.

As shown in FIG. 2, steering column 12 includes a steering shaft 18 disposed at an axial core portion thereof and a column tube 20 that covers steering shaft 18, is inserted through an opening portion 16 provided at an instrument panel 22 which is an interior member, and projects further towards a vehicle rear side than instrument panel 22. At a rear end side of steering column 12 is provided a combination switch 28. At a rear end of steering shaft 18 is fixed a steering wheel (not shown) for controlling the vehicle.

Steering shaft 18 and column tube 20 are configured to extend or retract along axis line L of steering column 12 by a manual tilt/telescopic structure 30. Specifically, steering shaft 18 is divided into an upper steering shaft disposed at a vehicle rear side (not shown), and a lower steering shaft 31 disposed at a vehicle front side (see FIG. 1). A front end portion of the upper steering shaft and a rear end portion of lower steering shaft 31 may be connected at a predetermined overlap width. Thereby, the forward/rear position of the steering wheel can be adjusted by operating steering shaft 18 telescopically, and if a load equal to or greater than a predetermined value acts from a steering wheel side in a forward direction along axis line L, steering shaft 18 can collapse (is able to move in an axial direction) within the range of a predetermined stroke.

Since the upper steering shaft and lower steering shaft 31 are connected by splining, each cannot rotate relative to the other. Thereby, an operating force applied to the steering wheel is transmitted to an intermediate shaft (not shown) via steering shaft 18, and then to a steering gear box (not shown).

Column tube 20 has a concentric structure of two tubes, an outer tube 32 disposed at a vehicle rear side, and an inner tube 34 disposed at a vehicle front side. Steering shaft 18 is supported inside column tube 20 by a bearing (not shown) so as to be capable of relative rotation. In the present embodiment, outer tube 32 has a larger diameter than inner tube 34. When tilt/telescopic structure 30 of steering column 12 is manually operated, this configuration is standard; however, the relation of the diameter sizes may be the reverse of the present embodiment.

As shown in FIGS. 1 and 2, column tube 20 is supported by at least a column bracket 36. This column bracket 36 is supported by an instrument panel reinforcement (not shown) that extends in instrument panel 22 along a vehicle width direction. At column bracket 36, a rocking axis 3a of tilt/telescopic structure 30 is provided in a vehicle width direction. At a manual steering column 12, when a load equal to or greater than a predetermined value is input in the direction of axis line L, column bracket 36 separates from the instrument panel reinforcement, and steering column 12 collapses in the direction of axis line L, thereby absorbing an impact.

Figure 3:
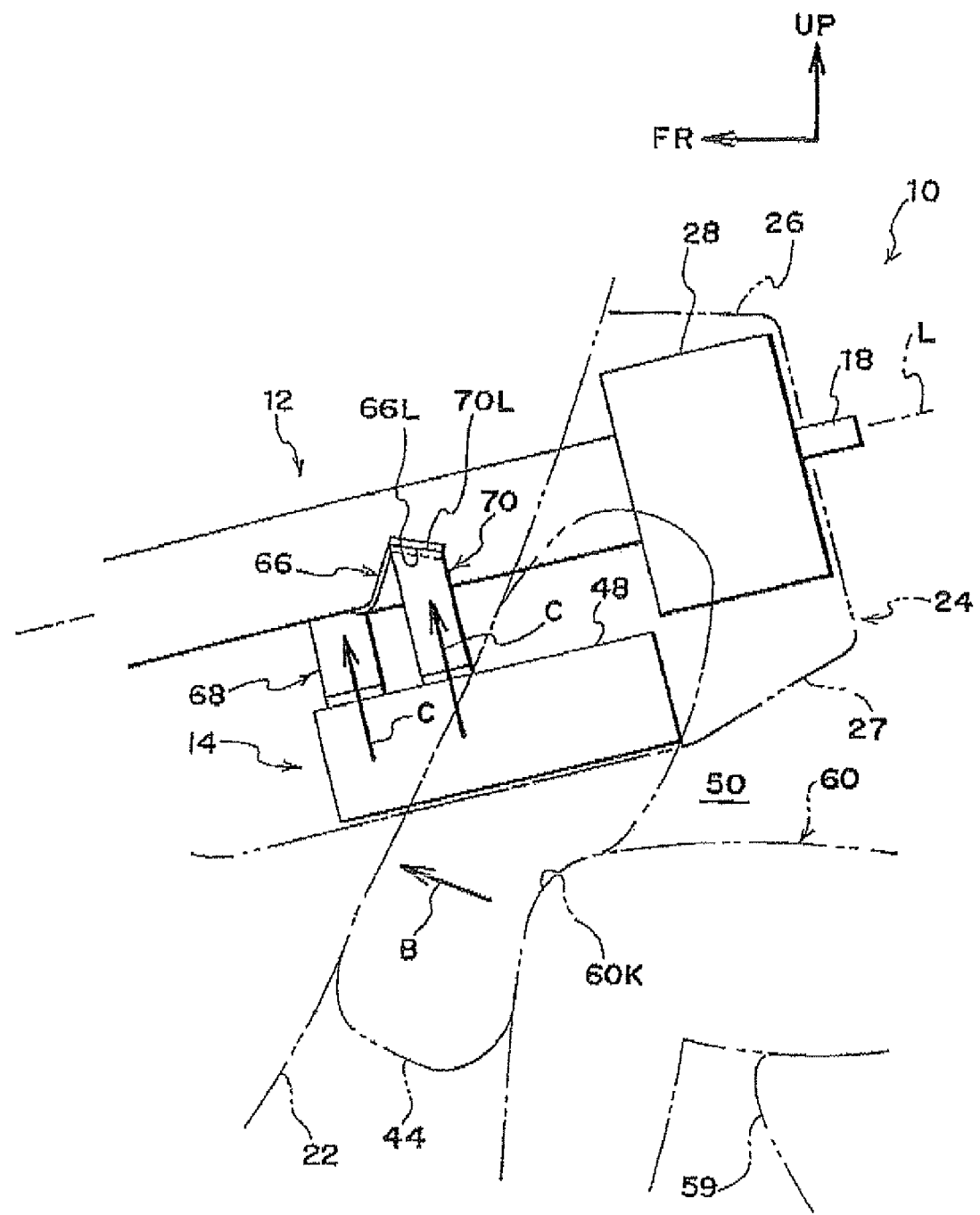

In FIGS. 1-3, a rear end side of steering column 12 is covered by a column cover 24. This column cover 24 may be formed of synthetic resin, and may have a multi-part configuration including a vehicle upper side upper cover 26 (see FIG. 3) and a vehicle lower side lower cover 27, in which upper cover 26 and lower cover 27 are joined together to form a tube shape. As shown in FIGS. 2 and 3, for the purpose of attaching a steering wheel, a rear end of steering shaft 18 projects from inside column cover 24 towards a vehicle rear.

A lock device (not shown) is provided at, for example, a side portion of a vehicle right side of steering column 12. The lock device includes, for example, a key cylinder and an ignition switch (both not shown), and is fixed to outer tube 32 of column tube 20 by using, for example, a circular attachment portion 40. As shown in FIG. 1, a through hole 42 is formed opposing a key insertion hole (not shown) of a key cylinder, at a side portion of a vehicle right side of lower cover 27.

As shown in FIGS. 1 and 2, knee airbag module 14 is fixed inside column cover 24 at a lower portion outer peripheral surface side of steering column 12, and a knee airbag 44 in a folded state (FIG. 3) and an inflator 46 that can supply gas to knee airbag 44 are assembled in a module case 48.

Knee airbag module 14 is attached to lower cover 27 before fixing to steering column 12. Specifically, in FIGS. 1 and 2, at an inner surface of lower cover 27 of column cover 24, a front wall portion 52 and a rear wall portion 54, that restrict the deployment direction of knee airbag 44, and that promote expansion and deployment towards a vehicle compartment 50 side (see FIG. 3), may project vertically and may be integrated with lower cover 27. Front wall portion 52 is provided adjoining a vehicle front side of knee airbag module 14, and rear wall portion 54 is provided adjoining a vehicle rear side of knee airbag module 14. Plural through holes may be formed in a line in a vehicle width direction at each of front wall portion 52 and rear wall portion 54. At a front end and a rear end of module case 48, respectively, plural hooks 56 may be formed arranged in a line in a vehicle width direction. The hooks 56 may engage with the corresponding through holes of front wall portion 52 and rear wall portion 54. Steel plate may be used as the material for module case 48.

Knee airbag 44 is folded in a state in which it may include inflator 46, and is configured such that, upon receiving a supply of gas from inflator 46, it may expand and deploy from inside column cover 24 to a knee portion 60K (vehicle compartment 50) side of a vehicle occupant 60 who is seated at a driver's seat 59. At lower cover 27 of column cover 24 is formed a tear line (not shown) which is a portion that is intended to break, and owing to an expansion pressure of knee airbag 44, the tear line tears open and a portion of lower cover 27 opens, such that knee airbag 44 may expand and deploy to a vehicle compartment 50 side.

Inflator 46 is operated by an ignition current from an airbag ECU (not shown), and is a gas supply source that may supply gas to knee airbag 44, and may have a substantially cylindrical shape. When the airbag ECU determines from a signal from an impact sensor (not shown) that a frontal impact to a vehicle has occurred, it sends an operation current to inflator 46. As inflator 46, a component enclosing a gas generating agent, or a component enclosing a high pressure gas may be used.

Example configurations of inflator 46 may be briefly explained as follows. In the case of a component enclosing a gas generating agent, said component may include a cylindrical housing with a base, the housing having plural gas ejection holes formed in a peripheral surface thereof, a gas generating agent that generates gas by combustion disposed within the housing, a filter that removes fragments of the gas generating agent following combustion thereof, and an electric starter device provided at an end portion of an opening side of the housing that ignites the gas generating agent.

In the case of a component enclosing a high pressure gas, said component may include a cylindrical housing with a base, a pressure bulkhead disposed within the housing, a gas mixture of argon and helium, or the like, enclosed in a chamber defined by the pressure bulkhead and housing, a moving member that is movably disposed near the pressure bulkhead, and that can break the pressure bulkhead by moving, and an electric starter device that is provided at an end portion of an opening side of the housing and that causes the moving member to move. An inflator 46 that encloses a high pressure gas is commonly used in a column-mounted knee airbag device 10, since knee airbag 44 may be made comparatively small and a gas volume may be comparatively reduced thereby.

A stud bolt 58 is provided vertically from inflator 46 and has a length sufficient to pass through module case 48. A nut 62 is fastened to stud bolt 58 from a vehicle upper side, thereby attaching inflator 46 and knee airbag 44 to module case 48.

Inflator 46 may be disposed in module case 48 directly under or substantially under column tube 20, and may be parallel or substantially in parallel with column tube 20. That is, an axis line of inflator 46 may be parallel or substantially parallel with axis line L of column tube 20. Thereby, it is possible to easily avoid interference between inflator 46 and other parts provided in column cover 24 such as a steering lock device (not shown). As a result, it is possible to effectively use a limited space within column cover 24. However, the manner in which inflator 46 is disposed is not limited to the above.

As shown in FIGS. 1 and 2, in column-mounted knee airbag device 10 according to the present embodiment, when knee airbag module 14 is fixed to a lower portion outer peripheral surface side of steering column 12, it is possible to perform the fixing from a vehicle upper side and a vehicle rear side of steering column 12, using a space 64 between instrument panel 22, which is an interior member at a vehicle upper side of steering column 12, and combination switch 28, which is provided at a rear end side of steering column 12.

In order to make knee airbag module 14 fixable to steering column 12, one of an upper attachment bracket or a lower attachment bracket is provided at a steering column 12 side, and the other of the upper attachment bracket or lower attachment bracket is provided at a knee airbag module 14 side. In the present embodiment, upper attachment bracket 66 is provided at a steering column 12 side, and lower attachment brackets 68 and 70 are provided at a knee Airbag module 14 side. Of these, lower attachment bracket 68 is disposed at a vehicle right side, and lower attachment bracket 70 is disposed at a vehicle left side. Lower attachment bracket 68 disposed at a vehicle right side is offset forward in a direction of axis line L of steering column 12, further than lower attachment bracket 70 disposed at a vehicle left side, in order to avoid interference with a lock device (not shown).

Upon fixing knee airbag module 14 to steering column 12, upper attachment bracket 66 and lower attachment bracket 68 at a vehicle right side are fastened at fastening surfaces 66R and 68R, and upper attachment bracket 66 and lower attachment bracket 68 at a vehicle left side are fastened at fastening surfaces 66L and 70L.

Fastening surface 68R of lower attachment bracket 68 and fastening surface 70L of lower attachment bracket 70L may respectively be inclined at the same angle to face a vehicle upper side and a vehicle rear side with respect to axis line L of steering column 12. Conversely, fastening surfaces 66R and 66L of upper attachment bracket 66 may respectively be inclined at the same angle to face a vehicle lower side and a vehicle front side with respect to axis line L of steering column 12. Fastening surface 66R at a vehicle right side of upper attachment bracket 66 is joined superimposed on fastening surface 68R of lower attachment bracket 68. Fastening surface 66L at a vehicle left side of upper attachment bracket 66 is joined superimposed on fastening surface 70L of lower attachment bracket 70.

An example configuration of upper attachment bracket 66 shown in FIG. 1 will be explained in the following. In FIG. 1, upper attachment bracket 66 is shown in two places connected by the dot-dash lines. However, this does not mean that two upper attachment brackets 66 are used. In order to indicate the shape of upper attachment bracket 66 clearly, upper attachment bracket 66 is shown not only in a state of being fixed to steering column 12, but also in a state before it is fixed to steering column 12.

Upper attachment bracket 66 may be a member formed by press forming a steel plate, and may be joined at a fixing portion 66A to a lower portion outer peripheral surface of outer tube 32 by welding or the like. Fixing portion 66A is formed as a curved surface according to the lower portion outer peripheral surface of outer tube 32. Fastening surface 66R at a vehicle right side is formed integrally with fixing portion 66A at a vehicle right side, and fastening surface 66L is formed integrally with fixing portion 66A at a vehicle left side.

Additionally, in a vehicle plan view, fastening surface 66R at a vehicle right side is formed at a position projecting further to a vehicle right side than outer tube 32. Similarly, fastening surface 66L at a vehicle left side is formed at a position projecting further to a vehicle left side than outer tube 32. Fastening surface 66R and fastening surface 66L are respectively formed with through holes 66B, 66C for bolts 72, 74 to pass through.

The following is a simple explanation of an example configuration of lower attachment bracket 68 at a vehicle right side. Lower attachment bracket 68 may be a member formed by press forming a steel plate, and may be joined at a fixing portion 68A near a front end of an upper surface of module case 48, which is also formed from a steel plate, by welding or the like. At a vehicle right side end affixing portion 68A is formed a leg portion 68B that extends towards a vehicle upper side such that it intersects axis line L of steering column 12 at a right angle. An upper portion of leg portion 68B curves towards a vehicle rear side, and a fastening surface 68R is formed at an upper end thereof so as to project towards a vehicle right side. At a lower surface of fastening surface 68R at lower attachment bracket 68, nut 76 which is to be fastened by bolt 72 is fixed by welding or the like.

The following is a simple explanation of an example configuration of lower attachment bracket 70 at a vehicle left side. Lower attachment bracket 70 may be a member formed by press forming a steel plate such that it has a sectional hat shape, and may be joined to an upper surface of module case 48 at a pair of left and right fixing portions 70A. In the present embodiment, since a lock device is provided at a side portion at a vehicle right side of steering column 12, interference is unlikely to occur between lower attachment bracket 70 at a vehicle left side and the lock device. As a result, as shown in FIG. 2, lower attachment bracket 70 at a vehicle left side is offset further towards a rear side in a direction of axis line L of steering column 12 than lower attachment bracket 68 at a vehicle right side.

As shown in FIG. 1, at each end of the pair of left and right fixing portions 70A, is formed a leg portion 70B that extends towards a vehicle upper side such that it intersects axis line L of steering column 12 at a right angle. Fastening surface 70L is formed so as to be connected in a vehicle width direction with an upper end of the pair of leg portions 70B. At a lower Surface of fastening surface 70L of lower attachment bracket 70, nut 78 which is to be fastened by bolts 74 is respectively fixed by welding or the like.

Operation

The present embodiment has the above configuration. The operation thereof is as follows. As shown in FIGS. 1 and 2, in column-mounted knee airbag device 10 according to the present embodiment, when knee airbag module 14 is fixed to a lower portion outer peripheral surface side of steering column 12, it is possible to perform the fixing from a vehicle upper side and a vehicle rear side of steering column 12, using a space 64 between instrument panel 22 at a vehicle upper side of steering column 12, and combination switch 28, which is provided at a rear end side of steering column 12. Therefore, when performing an attachment operation of knee airbag module 14 to steering column 12, there is no need for an operator (not shown) to enter from a lower side of steering column 12. As a result, it is possible to improve the workability of the attachment operation of knee airbag module 14 to steering column 12.

Specifically, as shown in FIG. 2, knee airbag module 14 is provided at a vehicle lower side of steering column 12, fastening surface 66R at a vehicle right side of upper attachment bracket 66 is superimposed on fastening surface 68R of lower attachment bracket 68 at a vehicle right side, and fastening surface 66L at a vehicle left side of upper attachment bracket 66 is superimposed on fastening surface 70L of lower attachment bracket 70 at a vehicle left side. Then a fastening tool 80 such as an electrically powered screwdriver or the like is inserted from space 64 between instrument panel 22 at a vehicle upper side of steering column 12 and combination switch 28, towards a vehicle front side and downward at an angle (in the direction of arrow A), and fastens bolt 74 to nut 78. Thereby, fastening surface 66L at a vehicle left side of upper attachment bracket 66 may be fixed to fastening surface 70L of lower attachment bracket 70 at a vehicle left side. Further, as shown in FIG. 1, by fastening bolt 72 to nut 76, fastening surface 66R at a vehicle right side of upper attachment bracket 66 may be fixed to fastening surface 68R of lower attachment bracket 68 at a vehicle right side.

In column-mounted knee airbag device 10, the fixing of knee airbag module 14 to steering column 12 is such that upper attachment bracket 66 and lower attachment brackets 68, 70 are fastened at their corresponding fastening surfaces 66R, 68R, 66L and 70L. Further, since fastening surface 68R of lower attachment bracket 68 at a vehicle right side, and fastening surface 70L of lower attachment bracket 70 at a vehicle left side are each inclined towards a vehicle upper side and a vehicle rear side with respect to axis line L of steering column 12, an operation of fixing knee airbag module 14 at a lower portion outer peripheral surface of steering column 12 can be easily performed from a vehicle upper side and a vehicle rear side of steering column 12. Thereby, the workability of an attachment operation of knee airbag module 14 can be further improved.

Moreover, as shown in FIG. 1, in column-mounted knee airbag device 10 according to the present embodiment, before knee airbag module 14 is fixed to steering column 12, knee airbag module 14 is attached to lower cover 27 of column cover 24, and thereby the attachment of each of lower cover 27 and knee airbag module 14 to steering column 12 can be performed at the same time. As a result, when attaching lower cover 27, there is no need for an operator to enter from a lower side of steering column 12, and thereby the workability of an attachment operation of lower cover 27 can be improved.

As shown in FIG. 3, in column-mounted knee airbag device 10 according to the present embodiment, when an airbag ECU determines that a vehicle frontal impact has occurred based on a signal sent from an impact sensor (not shown), an operating current is sent from the airbag ECU to inflator 46 (see FIG. 1). Inflator 46 receives the operating current and operates, and a large amount of gas is ejected from gas ejection holes. This gas is supplied to knee airbag 44, and thereby knee airbag 44 begins to expand. As a result of expansion pressure from knee airbag 44, lower cover 27 breaks open along a tear line (not shown), and a part of lower cover 27 becomes an airbag door and opens, and thereby knee airbag 44 expands and deploys from inside column cover 24 to a knee portion 60K (vehicle compartment 50) side of vehicle occupant 60 seated in driver's seat 59.

At this time, since fastening surfaces 66R, 66L, 68R and 70L of upper attachment bracket 66, lower attachment bracket 68 and lower attachment bracket 70 oppose a direction of a deployment force of knee airbag 44, a reaction force is generated quickly at an initial stage of the deployment of knee airbag 44. This reaction force acts upon lower cover 27, and thereby a part of lower cover 27 can be broken quickly. As a result, it is possible to expand and deploy knee airbag 44 quickly.

Knee portion 60K of vehicle occupant 60 is restricted by expanded and deployed knee airbag 44. An inertial force is input from knee portion 60K to knee airbag 44. Most of this inertial force is transmitted via knee airbag 44 to instrument panel 22 disposed at a vehicle front side of knee portion 60K, and via a load transmission member (not shown) to an instrument panel reinforcement (not shown). As a result, most of the inertial force is received by instrument panel 22. The remainder of the inertial force is transmitted in the direction of arrow B to the instrument panel 22, and via module case 48 and lower attachment brackets 68 and 70, in the direction of arrow C to upper attachment bracket 66. Thus, the remainder of the inertial force is received by fastening surfaces 66L and 66R (see FIG. 1) at which lower attachment brackets 68 and 70 are attached to upper attachment bracket 66.

Here, upper attachment bracket 66 is fixed to a lower portion outer peripheral surface of outer tube 32 at column tube 20, and since steering column 12 is supported by an instrument panel reinforcement, an attachment strength thereof is high. Since a load from knee portion 60K can be received by fastening surfaces 66L and 66R (see FIG. 1) that oppose a deployment force direction of knee airbag 44, as explained above, this configuration is advantageous in terms of strength. As a result, knee portion 60K of vehicle occupant 60 can be stably restricted by knee airbag 44.

In the above configuration, instrument panel 22 was introduced as an example of an interior member at a vehicle upper side of steering column 12; however, the interior member is not limited thereto, and may include, for example, a meter housing. Further, although knee airbag module 14 may be attached to lower cover 27 before fixing knee airbag module 14 to steering column 12, lower cover 27 may be attached separately after fixing knee airbag module 14. Moreover, the configuration and arrangement of upper attachment bracket 66, and lower attachment brackets 68 and 70 are not limited by the examples described above and in the figures. When an interfering object such as a lock device is not present in column cover 24, the lower attachment brackets 68 and 70 may be aligned in a front/rear direction.

Second Embodiment

Figure 4:
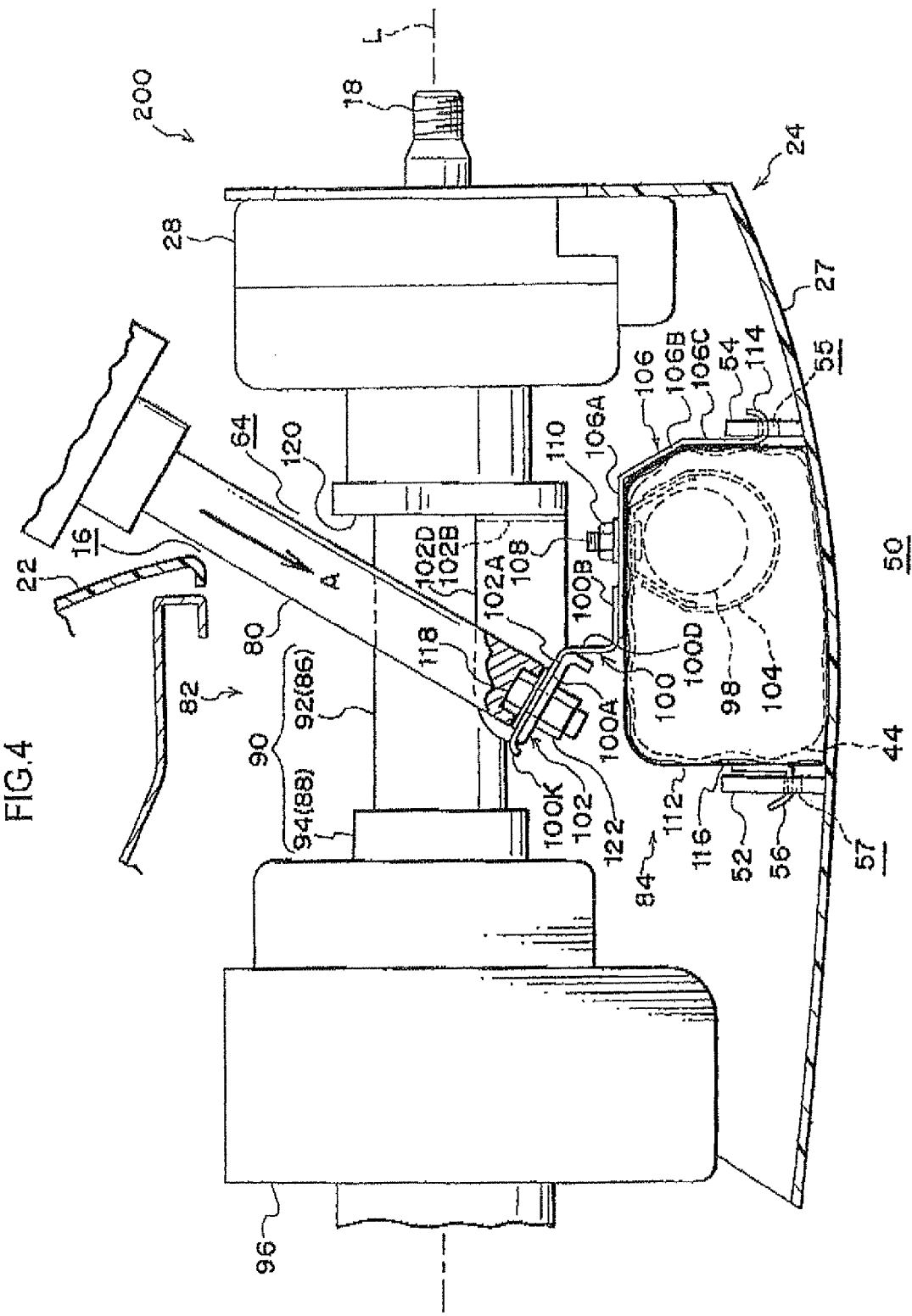
FIGS. 4-15 relate to the second embodiment.
Figure 5:
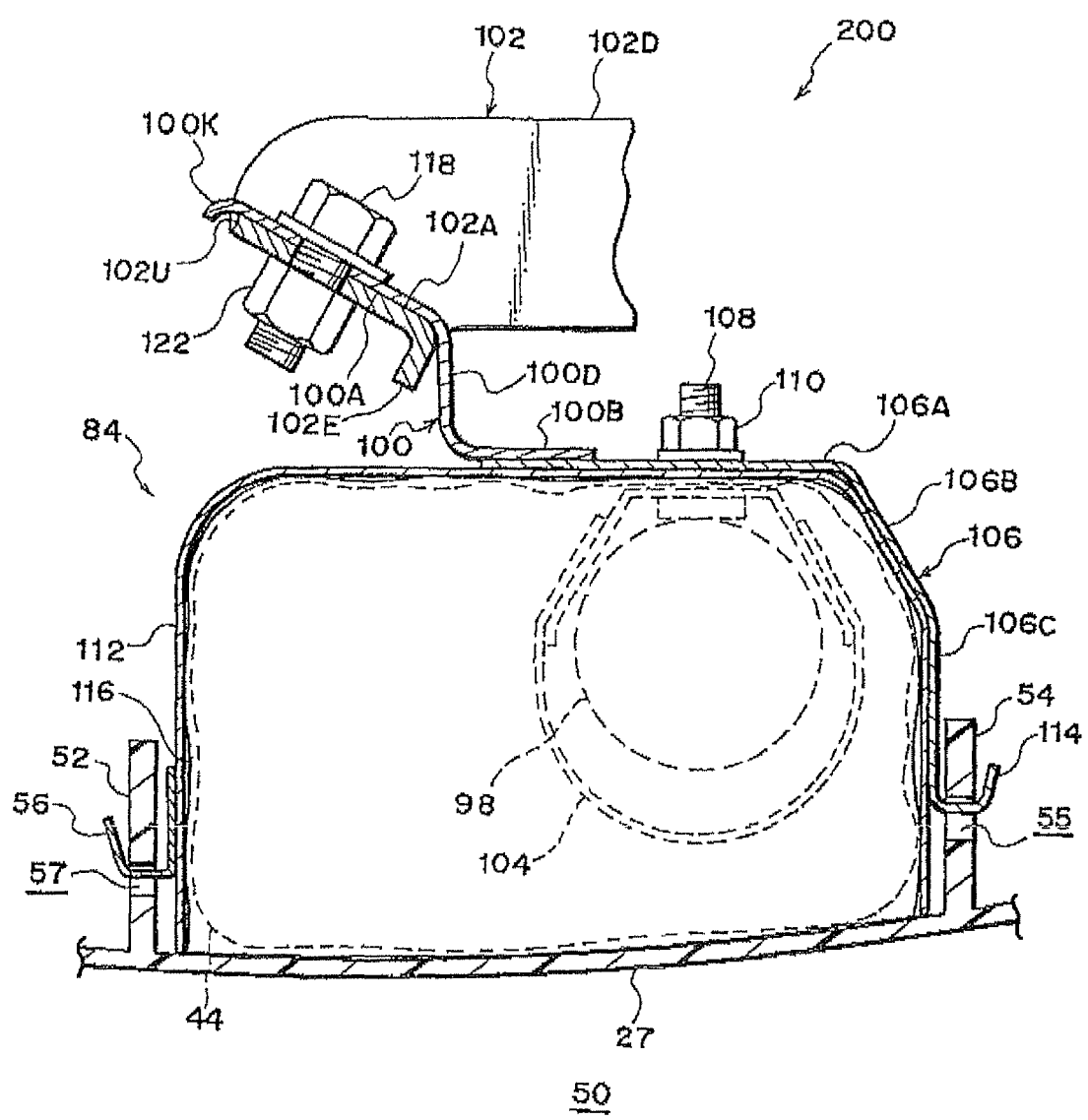
Figure 6:
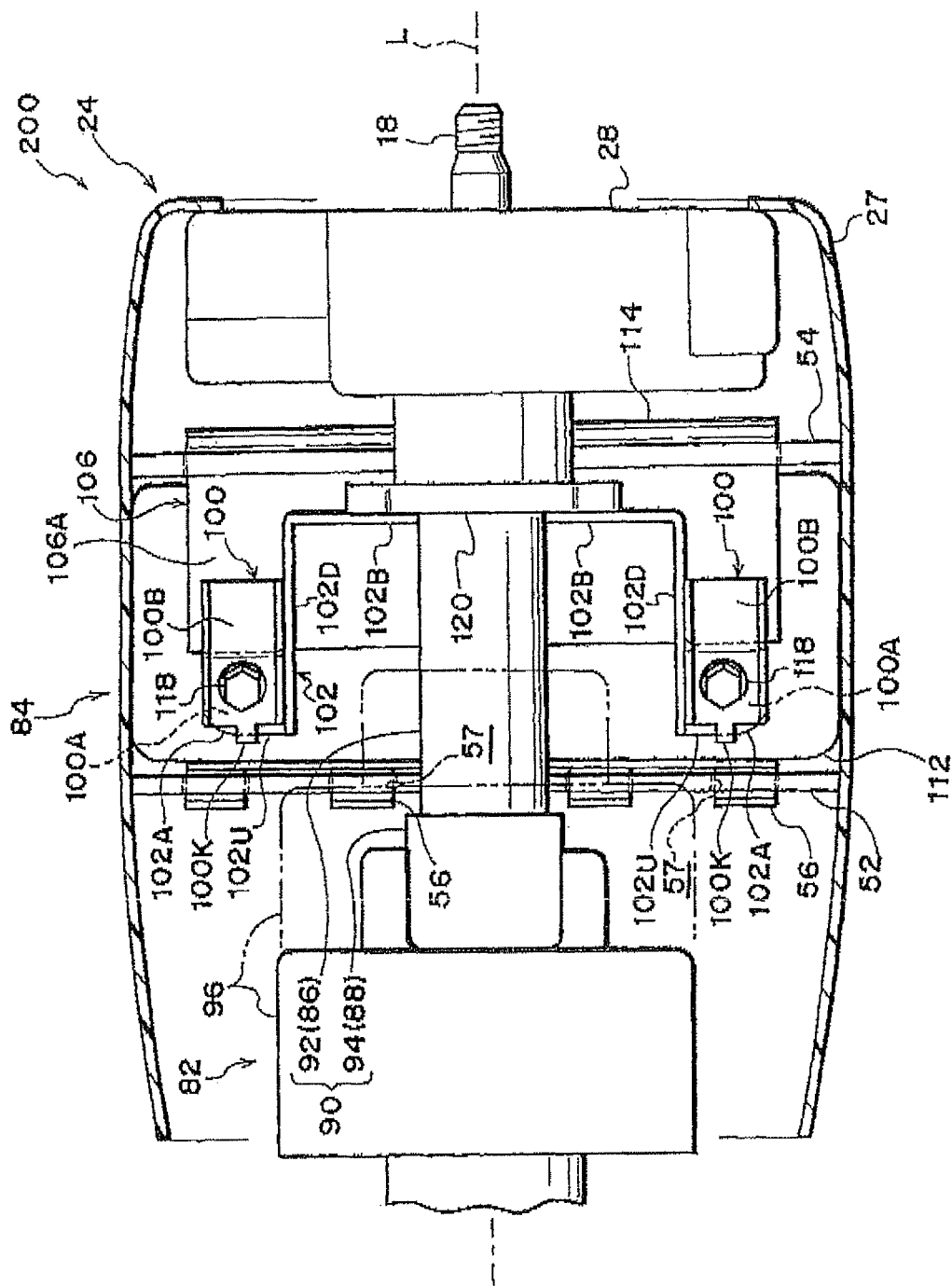

As shown in FIGS. 4-6, column-mounted knee airbag device 200 according to the present embodiment has a knee airbag module 84 fixed at a lower portion outer peripheral surface side of a steering column 82.

Steering column 82 is configured to include a steering shaft 18 disposed at an axial core portion thereof and a column tube 90 that covers steering shaft 18. Steering shaft 18 is inserted through an opening portion 16 disposed at an instrument panel 22 which is an interior member, and projects further towards a vehicle rear side than instrument panel 22. At a rear end side of steering column 82 is provided a combination switch 28. At a rear end of steering shaft 18 is fixed a steering wheel (not shown) for controlling the vehicle.

Steering shaft 18 and column tube 90 are configured to extend and retract along axis line L of steering column 82 by a motorized tilt/telescopic structure (not shown). Further, steering column 82 has a vehicle rear side portion 86 to which is fixed knee airbag module 84, and a vehicle front side portion 88. Moreover, steering column 82 is configured such that, if a load greater equal to or greater than a predetermined value is input to steering column 82 along axis line L of steering column 82, vehicle rear side portion 86 and vehicle front side portion 88 move relative to each other along axis line L and collapse, thereby absorbing an impact.

Column tube 90 has a concentric structure of two tubes, an inner tube 92 disposed at a vehicle rear side, and an outer tube 94 disposed at a vehicle front side. In the present embodiment, outer tube 94 has a larger diameter than inner tube 92. In steering column 82, inner tube 92 corresponds to vehicle rear side portion 86, and outer tube 94 corresponds to vehicle front side portion 88. A column bracket 96 that supports steering column 82 is provided at outer tube 94 which is vehicle front side portion 88, and a combination switch 28 and a knee airbag module 84 are provided at inner tube 92 which is vehicle rear side portion 86.

Therefore, if a load greater equal to or greater than a predetermined value is input along axis line L to steering column 82, inner tube 92, which is a movable side, may move relative to outer tube 94, which is a fixed side, along axis line L of steering column 82 and collapse, and is thereby configured such that it may absorb an impact. Although not shown in the drawings, when column tube 90 collapses, a resistance such as friction is generated between inner tube 92 and outer tube 94. In this way, an improved shock absorbing function can be achieved within a limited collapsing stroke.

As shown in FIGS. 4 and 5, knee airbag module 84 is fixed inside column cover 24 at a lower portion outer peripheral surface side of steering column 82, and is configured such that a knee airbag 44 in a folded state, an inflator 98 that can supply gas to knee airbag 44, and a diffuser 104 that limits a flow of gas supplied from inflator 98 are assembled at a module case 112.

Knee airbag 44 is folded in a state in which it includes inflator 98 and diffuser 104, and may be covered with a wrapping fabric 116, and is accommodated inside module case 112. At diffuser 104, a stud bolt 108 is arranged vertically from module case 112 and has a length sufficient to pass through an attachment bracket 106. Knee airbag 44 may be fixed to an upper surface 106A of attachment bracket 106 by stud bolt 108 and a nut 110.

Attachment bracket 106 may be a member formed by bending a steel plate, and is provided at a lower portion outer peripheral surface side of steering column 82. Attachment bracket includes an upper surface 106A disposed parallel to axis line L of steering column 82, an inclined surface 106E that extends from a rear end of upper surface 106A towards a vehicle rear and that inclines downwards, and a rear surface 106C that extends from a lower end of inclined surface 106E towards a vehicle lower direction. Upper surface 106A of attachment bracket 106 is formed to be larger than an outer diameter of diffuser 104 in a direction of axis line L of steering column 82. In other words, in order to ensure that a reaction force that arises when knee airbag 44 expands and deploys is generated stably, attachment bracket 106 is provided according to the position and size of inflator 98 and diffuser 104.

Inflator 98 is disposed at a vehicle lower side with respect to steering column 82, along a direction that intersects axis line L of steering column 82 at a right angle or substantially a right angle, and in module case 112 at a position offset towards a vehicle rear side. Thereby, it is possible to ensure a greater collapsing stroke of steering column 82 for absorbing an impact. Inflator 98, similar to inflator 46 of the first embodiment, operates due to an ignition current from an airbag ECU (not shown), and is a gas supply source that can supply gas to knee airbag 44, and may have a substantially cylindrical shape.

At a lower end of rear surface 1060 of attachment bracket 106, a hook 114 is provided extending in a vehicle width direction, and hook 114 engages with a through hole 55 of a rear wall portion 54. At a front end of module case 112 is provided a hook 56, and hook 56 engages with a through hole 57 of front wall portion 52. Knee airbag module 84 may be attached to lower cover 27 by hook 56 and hook 114 before fixing knee airbag module 84 to steering column 82. The shapes of attachment bracket 106 and hooks 56 and 114 are not limited to the above.

As shown in FIG. 4, in column-mounted knee airbag device 200 according to the present embodiment, when knee airbag module 84 is fixed to a lower portion outer peripheral surface side of steering column 82, it is possible to perform the fixing from a vehicle upper side and a vehicle rear side of steering column 82, using a space 64 between instrument panel 22, which is an interior member at a vehicle upper side of steering column 82, and combination switch 28, which is provided at a tear end side of steering column 82.

In the present embodiment, so that knee airbag module 84 which is attached to lower cover 27 may be attached to steering column 82, upper attachment bracket 100 is provided at a knee airbag module 84 side, and lower attachment bracket 102 is provided at a vehicle rear side portion 86 of steering column 82.

As explained above, in the present embodiment, if a load greater equal to or greater than a predetermined value is input along axis line L of steering column 82, vehicle rear side portion 86 and vehicle front side portion 88 may move relative to each other along axis line L, steering column 82 collapses and is configured such that it may absorb an impact. Together with this, as shown in FIG. 4, upper attachment bracket 100 and lower attachment bracket 102 are provided between combination switch 28 and vehicle front side portion 88 such that they do not interfere with vehicle front side portion 88 during the relative movement. Further, upper attachment bracket 100 and lower attachment bracket 102 are arranged at an outer side in a vehicle width direction of steering column 82, such that they do not interfere with vehicle front side portion 88, that is, outer tube 94 or column bracket 96 or the like, when vehicle rear side portion 86 and vehicle front side portion 88 move relative to each other and steering column 82 completely collapses, as shown by the chain double-dashed lines in FIG. 6.

FIG. 6 shows a positional relationship between vehicle front side portion 88, and upper attachment bracket 100 and lower attachment bracket 102, when steering column 82 is in a completely collapsed state. The chain double-dashed lines show a state in which column bracket 96 of vehicle front side portion 88 has moved in a vehicle rear direction; however, since vehicle front side portion 88 is a fixed side, vehicle rear side portion 86, which is a movable side, actually moves in a vehicle front direction.

Figure 7:
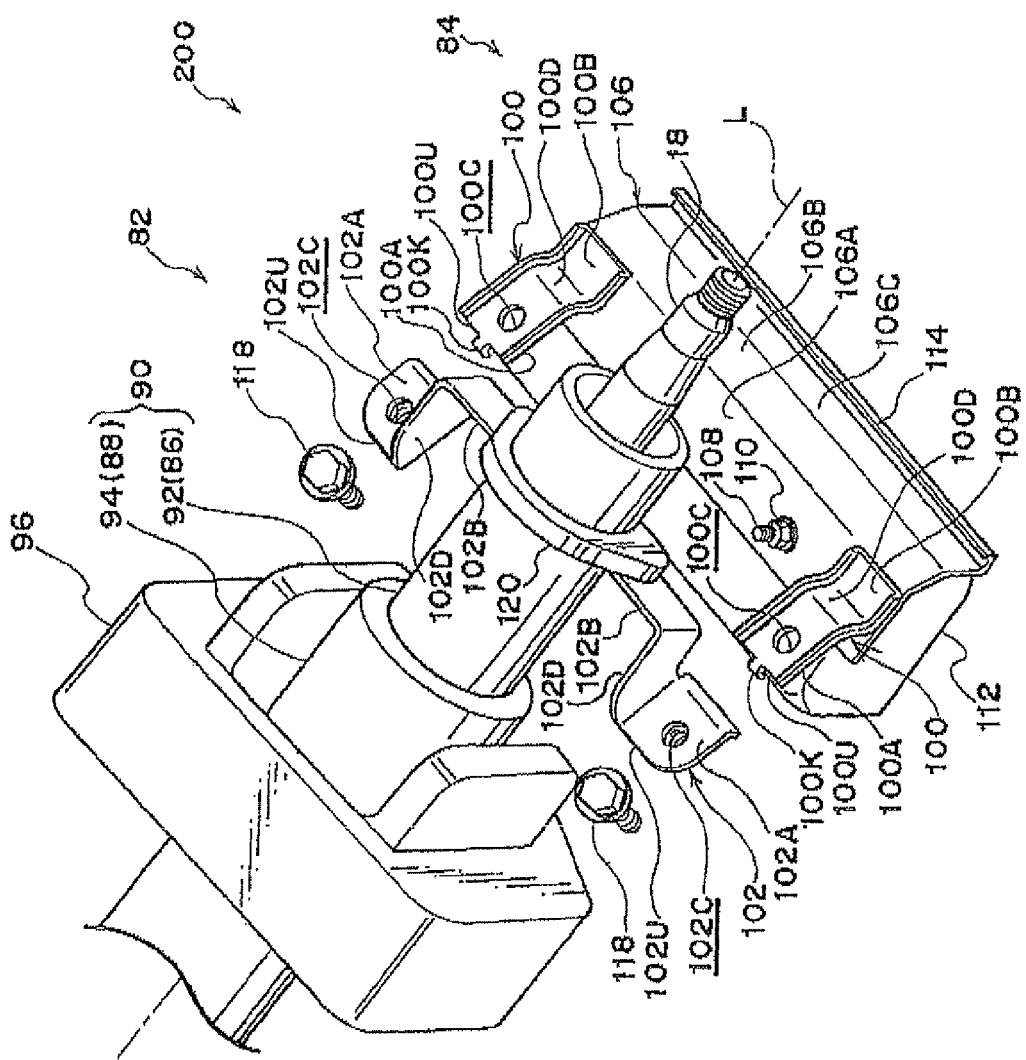
Figure 8:
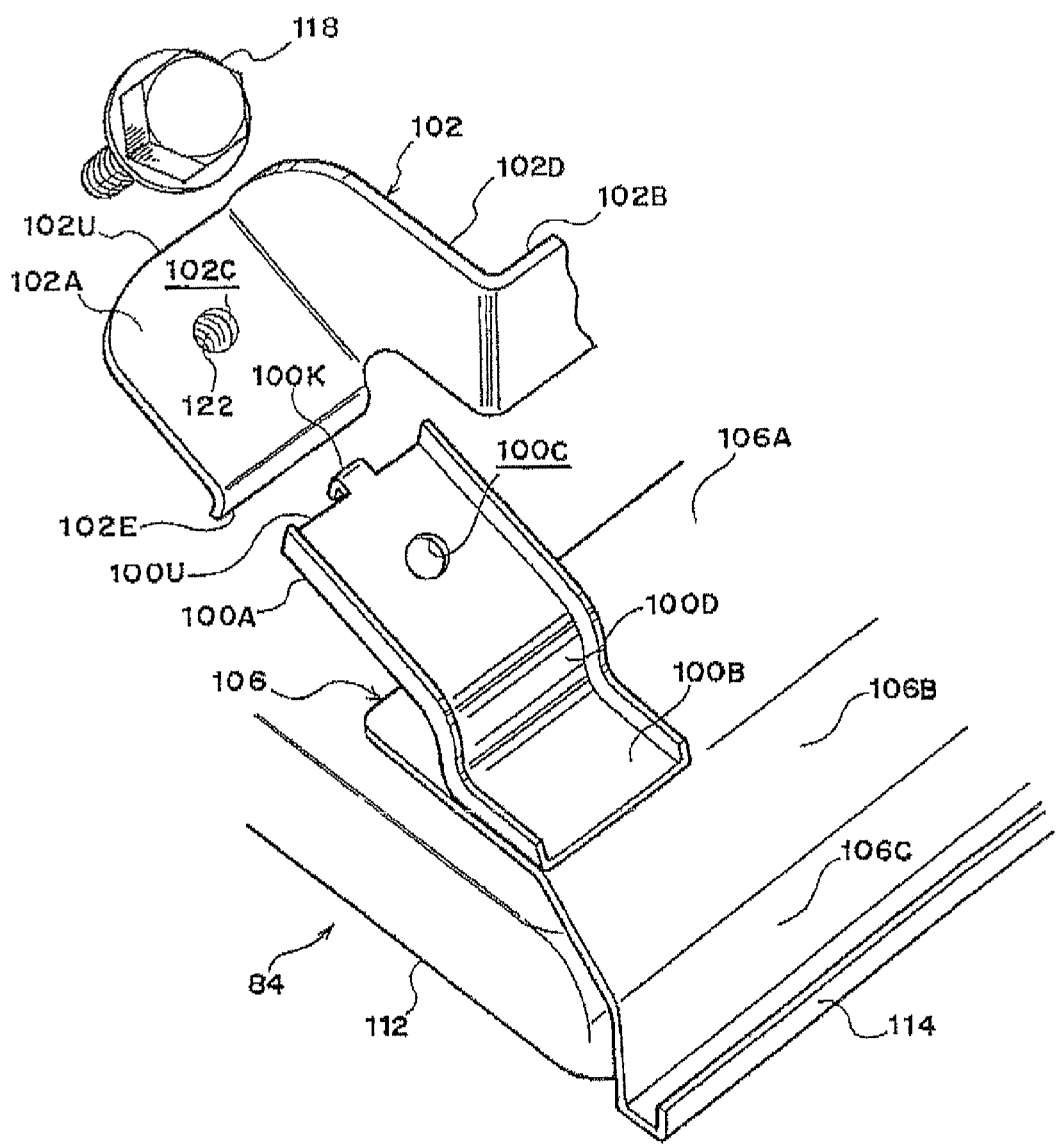
Figure 9:
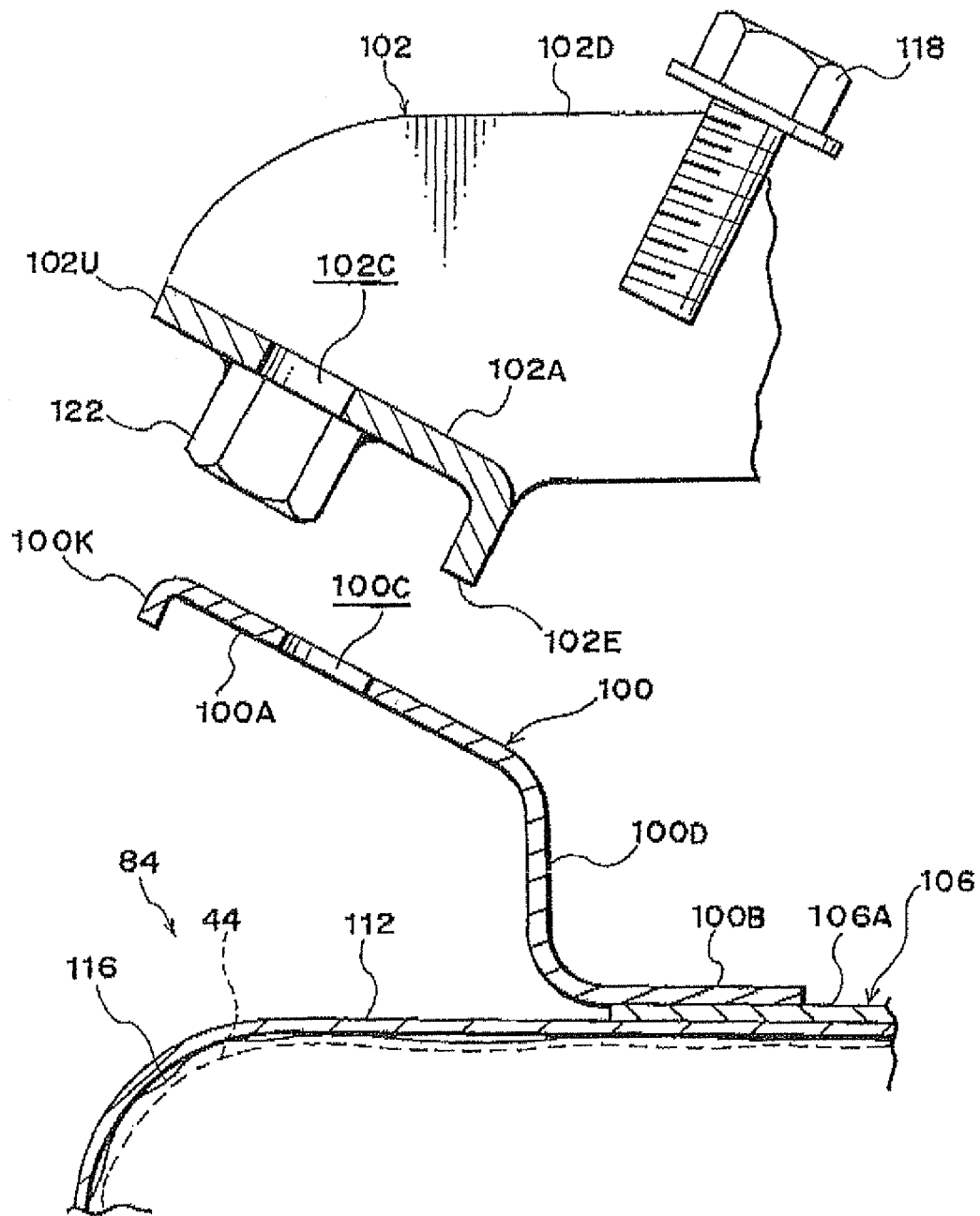

As shown in FIGS. 7-9, upper attachment bracket 100 may be a member formed by press forming a steel plate into a shape having a substantially "U" shape in a section thereof, and an upper attachment bracket 100 may be provided at symmetrical positions at each side in a vehicle width direction of axis line L of steering column 82.

Upper attachment bracket 100 may be fixed at a base portion 100B thereof to upper surface 106A of attachment bracket 106 by spot welding or the like. At upper attachment bracket 100 is formed a vertical portion 100D that vertically projects slightly from a front end of base portion 100E towards a vehicle upper direction, and a fastening surface 100A that bends towards a vehicle front direction from an upper end of vertical portion 100D, and extends upwards at an angle. At fastening surface 100A is formed a through hole 100C for a bolt 118 to pass through. At, for example, an upper end 100U of upper attachment bracket 100, is provided a engaging portion 100K capable of engaging with, for example, an upper end 102U of a fastening surface 102A when fastening surface 100A of upper attachment bracket 100 is superimposed on fastening surface 102A of lower attachment bracket 102 (see FIGS. 10-12). Engaging portion 100K may be configured to have a hook shape that projects towards a vehicle lower direction side. The width of engaging portion 100K may be greater than that shown in the drawings, so that engaging may be performed stably and over a wider range with respect to upper end 102U of fastening surface 102A.

As shown in FIGS. 7-9, lower attachment bracket 102 may be a member formed by press forming a steel plate, and may, for example, be fixed to a front surface of a flange portion 120 fixed to inner tube 92, at a fixing portion 102B that extends in a vehicle width direction. At both ends in a vehicle width direction of fixing portion 102B are formed respective intermediate portions 1021 that each bend towards a vehicle front direction. At front ends of intermediate portions 102D, are formed respective fastening surfaces 102A that each bend towards an outer side in a vehicle width direction. A through hole 102C is formed at fastening surface 102A for bolt 118 to pass through, and a nut 122, to which bolt 118 is fastened, is fixed by welding or the like at a rear surface (lower surface) side of fastening surface 102A. At a lower end of fastening surface 102A is formed a bending portion 102E for reinforcement, that increases a section modulus of fastening surface 102A.

Figure 10:
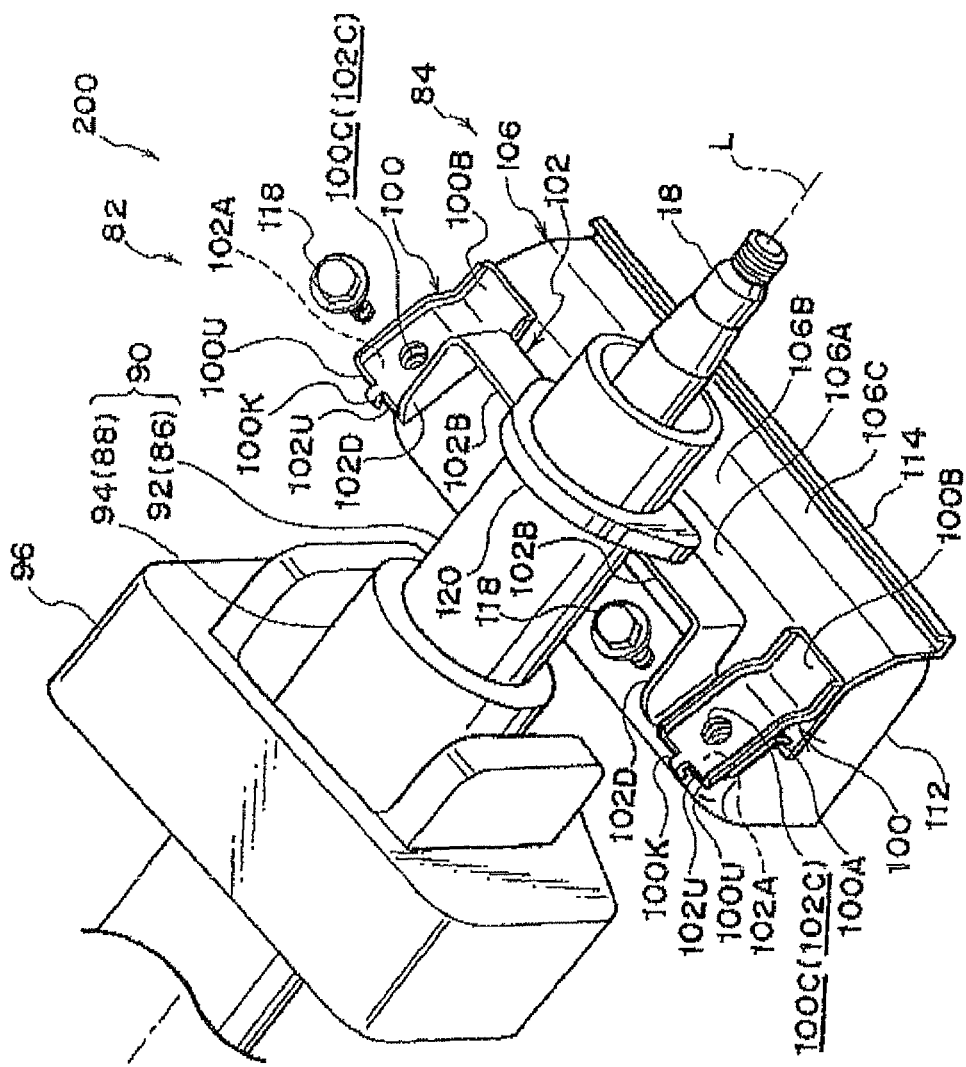
Figure 11:
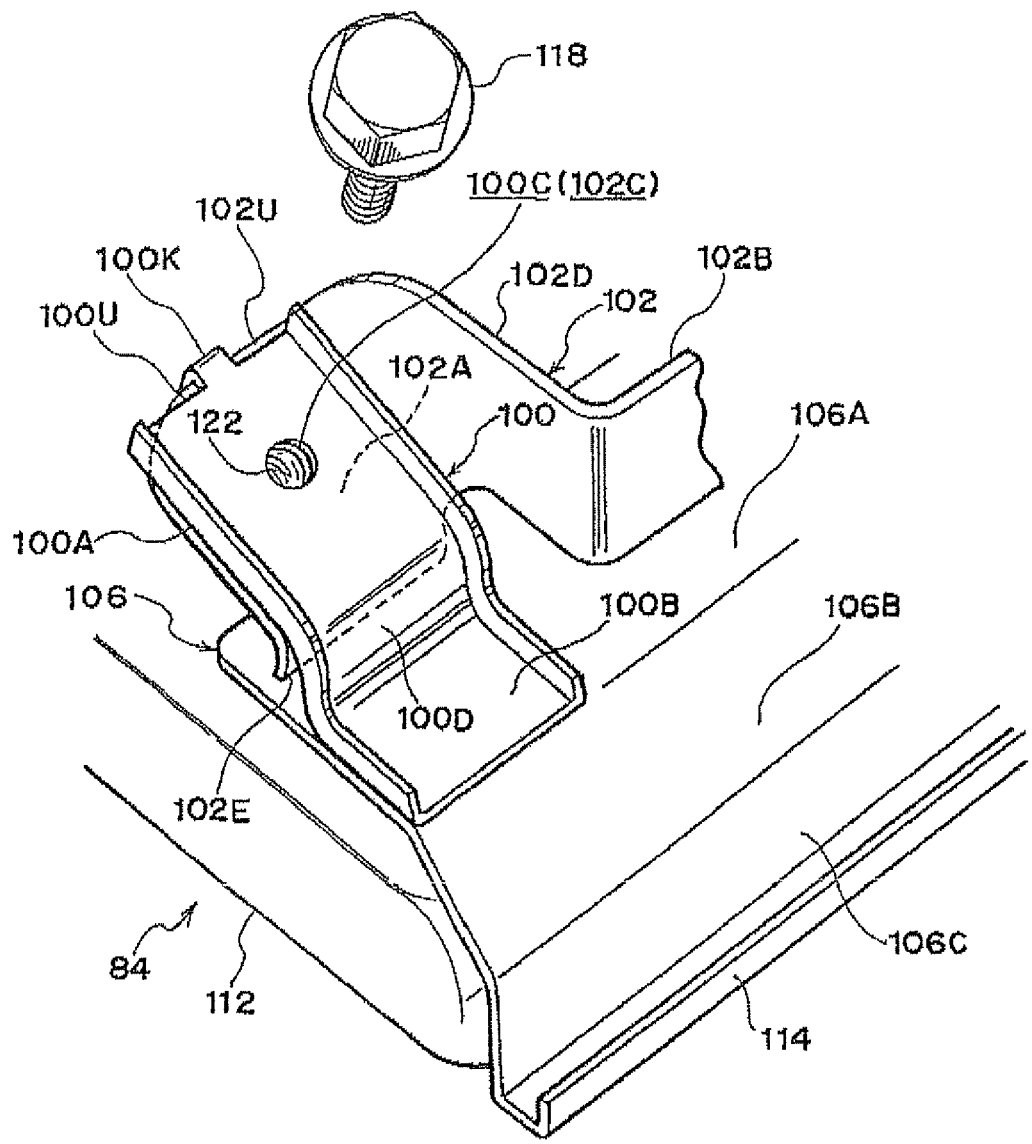
Figure 12:
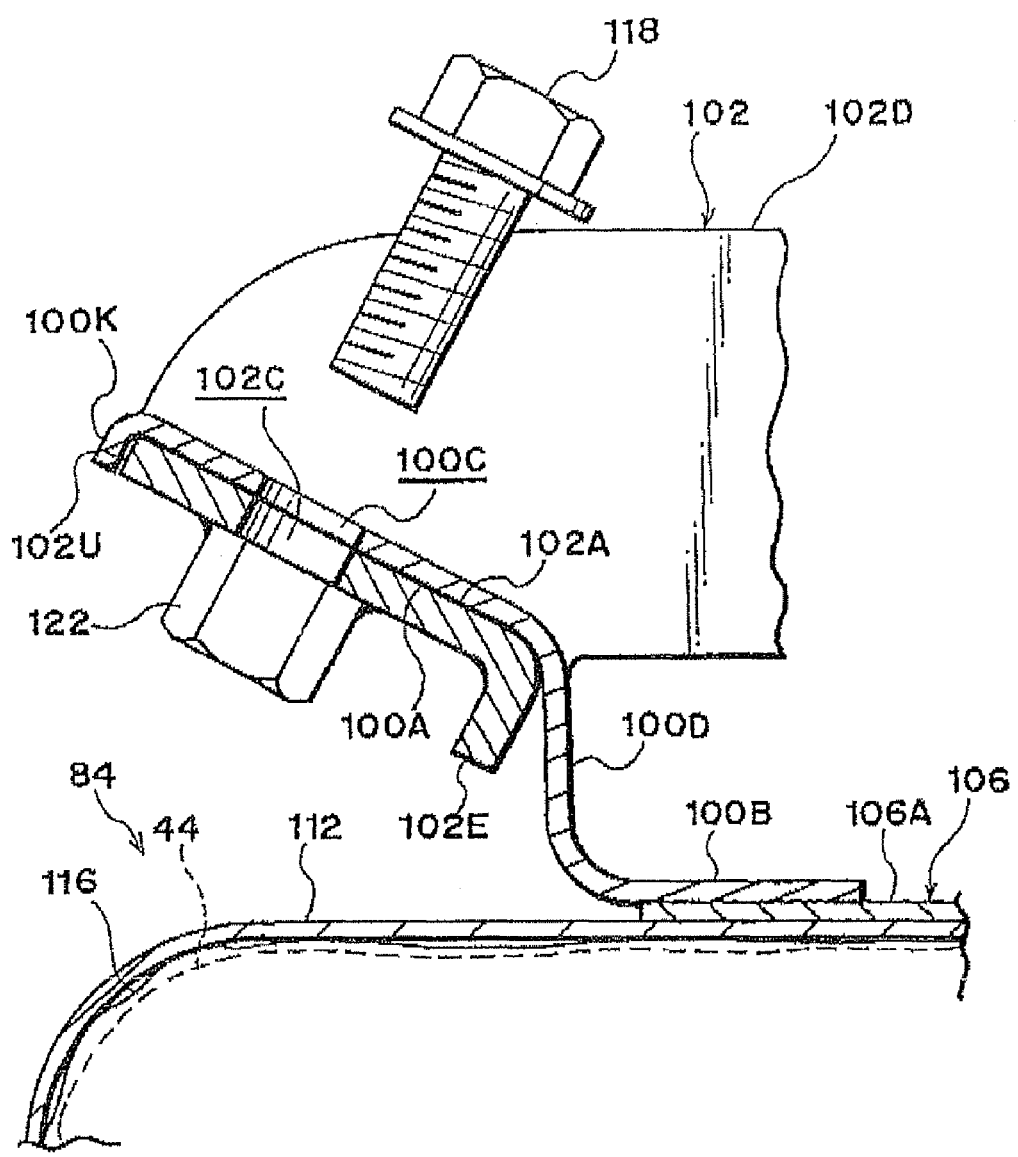
Figure 13:
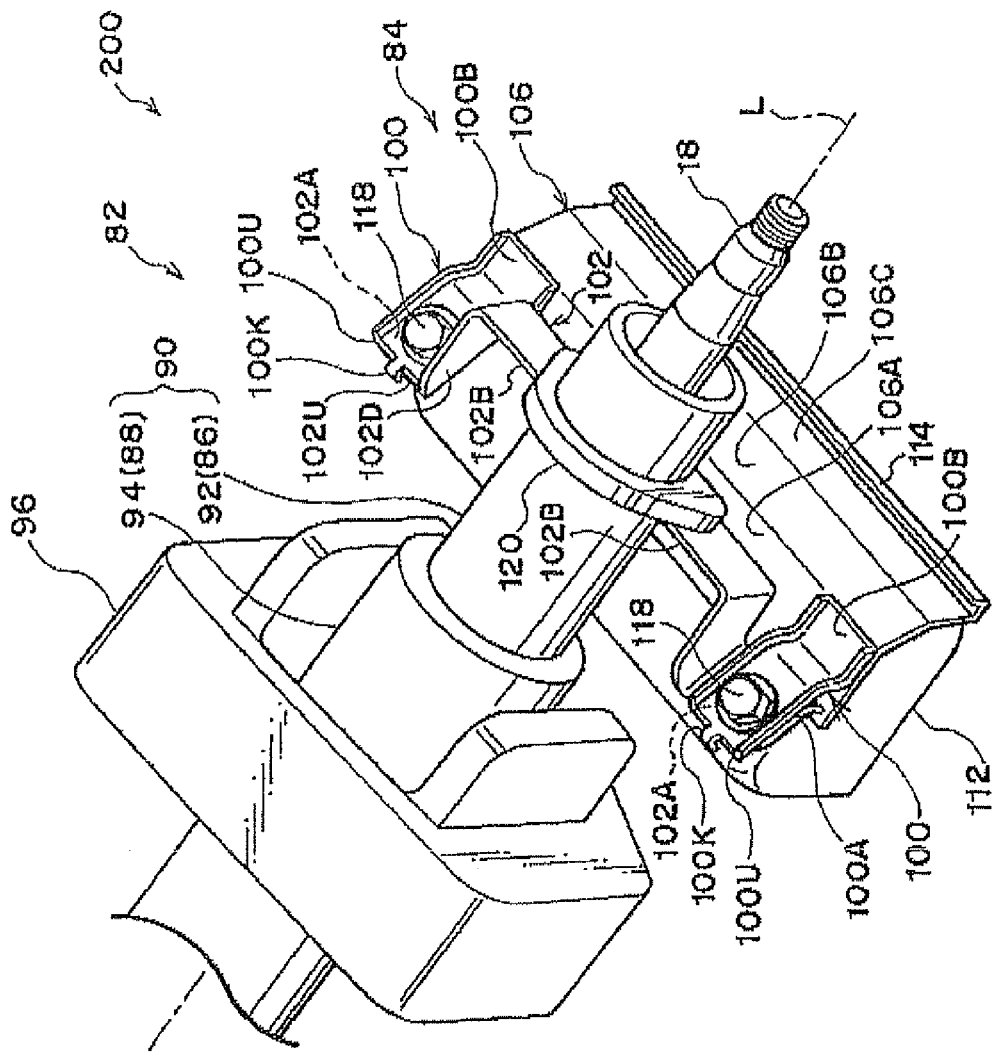
Figure 14:
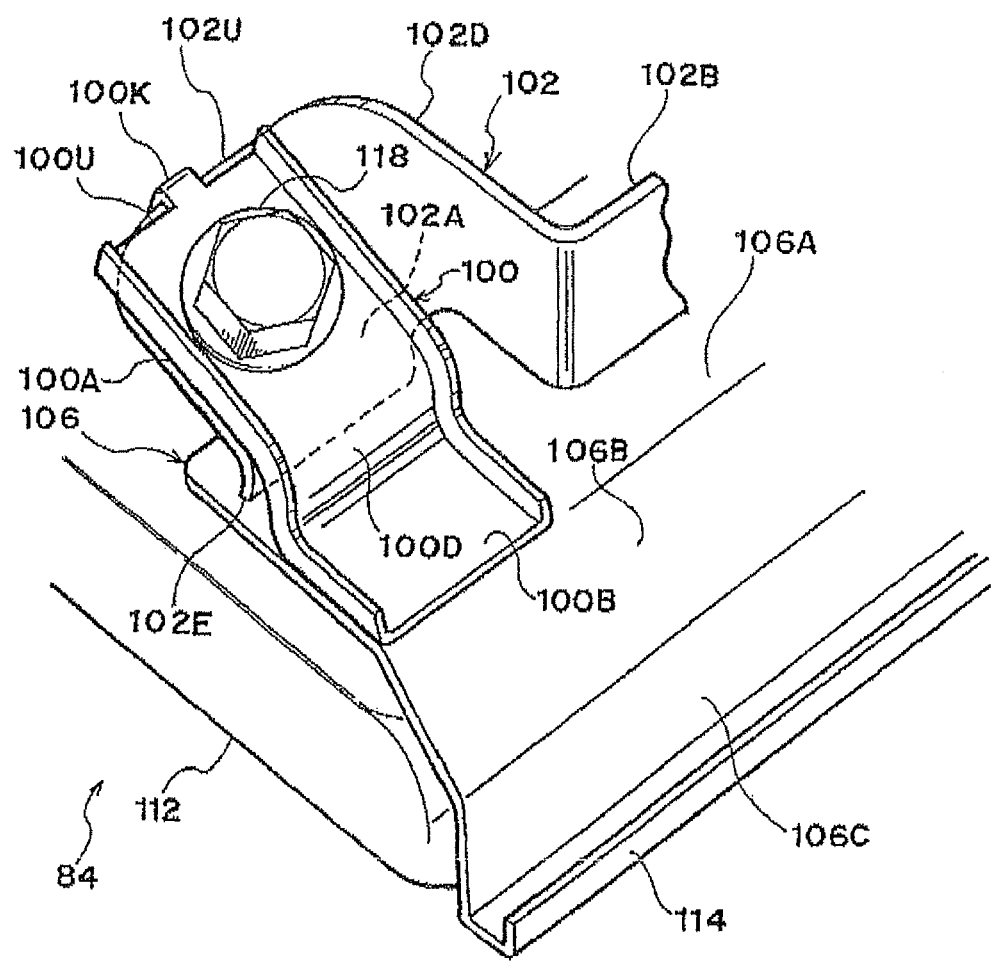
Figure 15:
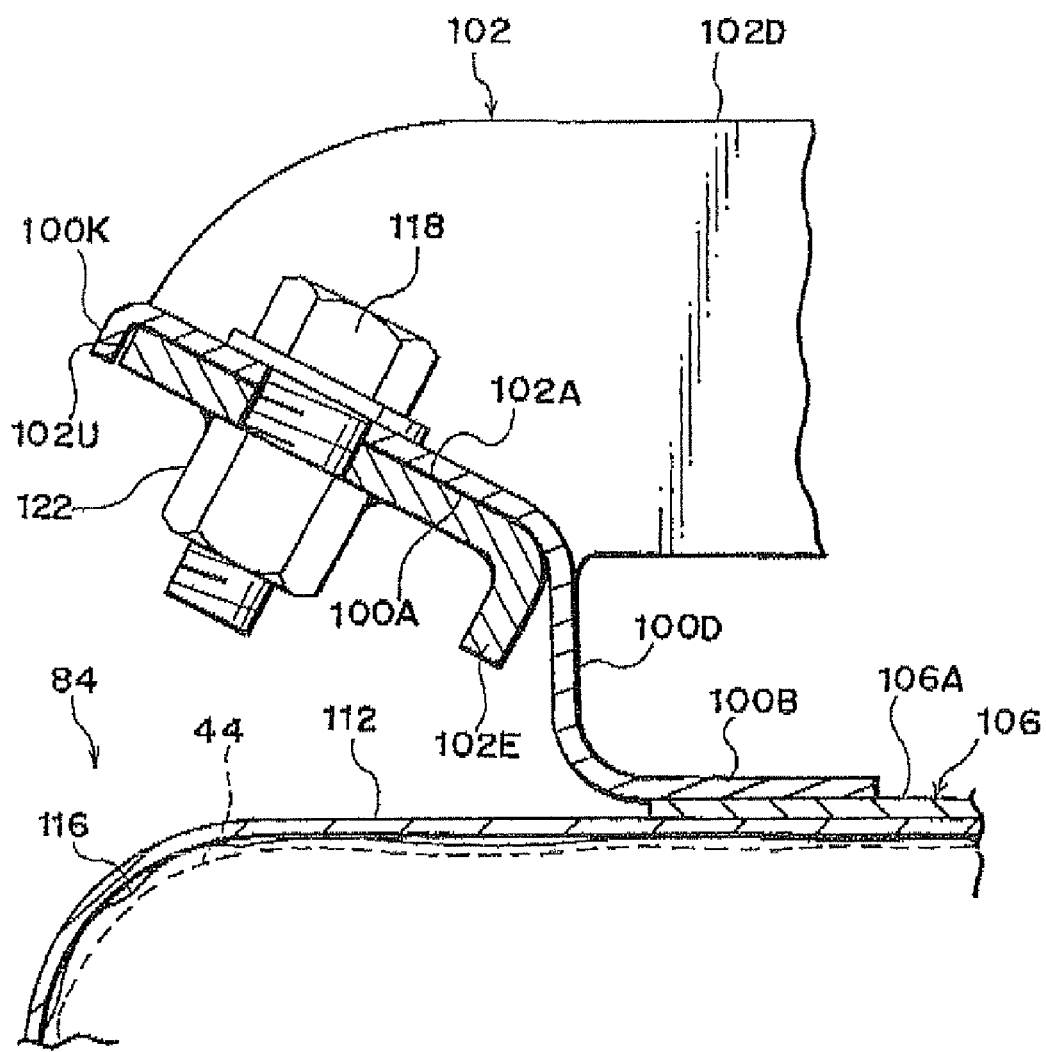

As shown in FIG. 4, fastening surfaces 102A of lower attachment bracket 102 respectively incline towards a vehicle upper side and a vehicle rear side with respect to axis line L of steering column 82. Conversely, fastening surfaces 100A of upper attachment bracket 100 respectively incline towards a vehicle lower side and a vehicle front side with respect to axis line L of steering column 82. As shown in FIGS. 10-12, fastening surface 100A of upper attachment bracket 100 is temporarily superimposed on fastening surface 102A so that engaging portion 100K may engage with upper end 102U of fastening surface 102A of lower attachment bracket 102, and subsequently, as shown in FIGS. 13-15, is fixed by bolt 118 and nut 122.

In the example shown in the drawings, intermediate portions 102D and fastening surface 102A of lower attachment bracket 102 are positioned at a vehicle width direction outer side of steering column 82, and a center portion of fixing portion 102B is not positioned at a vehicle width direction outer side of steering column 82. However, of the elements of lower attachment bracket 102, fixing portion 102B is positioned furthest towards a vehicle rear side, and is configured such that it does not interfere with vehicle front side portion 88 when steering column 82 is completely collapsed in order to absorb an impact. In other words, fixing portion 102B is positioned out of the scope of relative movement of vehicle front side portion 88 when it moves relative to vehicle rear side portion 86 when steering column 82 collapses.

Other portions of this embodiment are similar to those of the first embodiment, and identical portions have the same reference numerals, and explanation thereof is omitted.

Operation

The present embodiment has the above configuration. The operation thereof is as follows. As shown in FIGS. 1 and 2, in column-mounted knee airbag device 200 according to the present embodiment, when knee airbag module 84 is fixed to a lower portion outer peripheral surface side of steering column 82, it is possible to perform the fixing from a vehicle upper side and a vehicle rear side of steering column 82, using a space 64 between instrument panel 22, which is an interior member at a vehicle upper side of steering column 82, and combination switch 28, which is provided at a rear end side of steering column 82. Therefore, when performing an attachment operation of knee airbag module 84 to steering column 82, there is no need for an operator (not shown) to enter from a lower side of steering column 82.

In addition, in the present embodiment, as shown in FIGS. 10-12, upper attachment bracket 100 is provided at a knee airbag module 84 side, lower attachment bracket 102 is provided at vehicle rear side portion 86 of steering column 82, and engaging portion 100K, that can engage with lower attachment bracket 102 is formed at upper attachment bracket 100. Thereby, when knee airbag module 84 is attached to steering column 82, owing to engaging portion 100K of upper attachment bracket 100 engaging with lower attachment bracket 102, it is possible to temporarily place knee airbag module 84. As a result, knee airbag module 84 can be attached using only one hand, and the workability of the operation of attaching knee airbag module 84 to steering column 82 can be greatly improved.

Specifically, as shown in FIGS. 7-9, knee airbag module 84 which has been attached in advance to lower cover 27 (see FIG. 4), is brought to a vehicle lower side of steering column 82, and, as shown in FIGS. 10-12, fastening surface 100A of upper attachment bracket 100 is superimposed on fastening surface 102A of lower attachment bracket 102, engaging portion 100K formed at upper end 100U of fastening surface 100A engages with upper end 102U of fastening surface 102A, and thereby knee airbag module 84 can be temporarily placed on steering column 82. As a result, the respective positions of through hole 1000 of fastening surface 100A and through hole 1020 of fastening surface 102A can be easily aligned with each other, and this state may be easily maintained.

As shown in FIG. 4, a fastening tool 80 such as an electrically powered screwdriver or the like may be inserted from space 64 between instrument panel 22 at a vehicle upper side of steering column 82 and combination switch 28, towards a vehicle front side and downward at an angle (in the direction of arrow A), and may fasten bolt 118 to nut 122. Thereby, fastening surface 100A of upper attachment bracket 100 may be fixed to fastening surface 102A of lower attachment bracket 102. When performing the fixing, since knee airbag module 84 is temporarily placed with respect to steering column 82, an operator does not need to support knee airbag module 84, and since through holes 100C and 102C of fastening surfaces 100A and 102A, respectively, are aligned with each other, bolt 118 can be easily inserted through the through holes 1000 and 1020. Thus, in the present embodiment, the workability of the attachment operation of knee airbag module 84 is greatly improved.

As shown in FIG. 6, in column-mounted knee airbag device 200, when a load equal to or greater than a predetermined value is input along axis line L of steering column 82, and vehicle rear side portion 86 and vehicle front side portion 88 move relative to each other along axis line L and steering column 82 collapses, since upper attachment bracket 100 and lower attachment bracket 102 axe provided between combination switch 28 and vehicle front side portion 88 such that they do not interfere with vehicle front side portion 88, the relative movement of vehicle rear side portion 86 and vehicle front side portion 88 of steering column 82 can be performed smoothly. As a result, an impact absorbing performance of steering column 82 can be improved.

In the present embodiment, upper attachment bracket 100 and lower attachment bracket 102 are arranged at an outer side in a vehicle width direction of steering column 82, such that they do not interfere with vehicle front side portion 88, when vehicle rear side portion 86 and vehicle front side portion 88 move relative to each other and steering column 82 completely collapses, as shown by the chain double-dashed lines. As a result, an impact absorbing stroke of steeling column 82 can be ensured, and it is possible to reduce a dimension of steering column 82 in the direction of axis line L, and thereby the degree of freedom when mounting steering column 82 to a vehicle may be increased.

As shown in FIG. 4, in the present embodiment, inflator 98 is disposed at a vehicle lower side with respect to steering column 82, along a direction that intersects axis line L of steering column 82 at a right angle or substantially a right angle, and in module case 112 at a position offset towards a vehicle rear side. Thereby, it is possible to ensure a greater collapsing stroke of steering column 82 for absorbing an impact.

Although not shown in the drawings, the present embodiment may include a lock device for locking steering column 82 when parking or the like, provided further towards a vehicle front side than a vehicle front side portion 88 of steering column 82, such as at column bracket 96. Therefore, during a telescoping operation of steering column 82 or when steering column 82 collapses in order to absorb a shock, the lock device does not interfere with inflator 98.

The expanding and deploying operation of knee airbag 44, and the transmission of an inertial force of vehicle occupant 60 (see FIG. 3) from knee airbag 44 to steering column 82 via upper attachment bracket 100 and lower attachment bracket 102, are similar to those of the first embodiment.

In the present embodiment, fastening surface 100A of upper attachment bracket 100, and fastening surface 102A of lower attachment bracket 102 are each inclined with respect to axis line L of steering column 82. Further, the direction of fastening when knee airbag module 84 is fixed to steering column 82 is from a vehicle upper side and a vehicle rear side with respect to steering column 82; however, the direction of fastening is not limited to these. Fastening tool 80 may be inserted from a vehicle upper side towards a vehicle lower side, and bolt 118 may be fastened to nut 122 in this manner, or the fixing may be performed from another direction.

Further, in lower attachment bracket 102, intermediate portions 102D and fastening surfaces 102A are formed integrally at both sides in a vehicle width direction of fixing portion 102B. However, the invention is not limited to this, and fastening surfaces 102A may be independently provided at outer sides in a vehicle width direction of steering column 82. Moreover, upper attachment bracket 100 is provided at symmetrical positions at each side in a vehicle width direction of axis line L of steering column 82; however, the invention is not limited to this, and upper attachment brackets 100 at each side may be integrated together.

Further, engaging portion 100K is formed at upper end 100U of fastening surface 100A at upper attachment bracket 100, and engaging portion 100K engages with upper end 102U of fastening surface 102A at lower attachment bracket 102; however, the configuration of engaging portion 100K is not limited to this. A projecting portion that projects towards a fastening surface 102A side of lower attachment bracket 102 may be provided at a part of fastening surface 100A of upper attachment bracket 100, and a recessed portion or through hole that fits the projecting portion may be provided at fastening surface 102A. Moreover, at a lower end portion of fastening surface 102A of lower attachment bracket 102 may be provided a hook shaped projecting portion that projects towards a vehicle upper direction, and a engaging portion, such as a recessed portion or through hole, that engages with the projecting portion may be provided at fastening surface 100A of upper attachment bracket 100. In other words, engaging portion 100K of upper attachment bracket 100 may be configured to be able to engage with lower attachment bracket 102, and may have a projecting shape or a recessed shape.

DESCRIPTION OF REFERENCE NUMERALS

10 Knee airbag device
12 Steering column
14 Knee airbag module
22 Instrument panel (interior member)
24 Column cover
26 Upper cover
27 Lower cover
28 Combination switch
44 Knee airbag
46 Inflator
48 Module case
64 Space between instrument panel and combination switch at vehicle upper side
66 Upper attachment bracket
66L Fastening surface at a vehicle left side of upper attachment bracket
66R Fastening surface at a vehicle right side of upper attachment bracket
68 Lower attachment bracket
68R Fastening surface at a vehicle right side of lower attachment bracket
70 Lower attachment bracket
70L Fastening surface at a vehicle left side of lower attachment bracket
82 Steering column
84 Knee airbag module
86 Vehicle rear side portion of steering column
88 Vehicle front side portion of steering column
98 Inflator
100 Upper attachment bracket
100A Fastening surface of upper attachment bracket
100K Engaging portion
102 Lower attachment bracket
102A Fastening surface of lower attachment bracket
112 Module case
200 Column-mounted bee airbag device
L Axis line of steering column

The invention claimed is:

1. A column-mounted knee airbag device, comprising:
a knee airbag module, in a column cover that covers a rear end side of a steering column, fixed to a lower portion outer peripheral surface of the steering column and including a knee airbag in a folded state and an inflator that supplies gas to the knee airbag, assembled in a module case,
wherein when fixing the knee airbag module to the lower portion outer peripheral surface of the steering column, the knee airbag module is configured to be fixed from a vehicle upper side and a vehicle rear side of the steering column, using a space between an interior member at the vehicle upper side of the steering column and a combination switch provided at a rear end side of the steering column, the space being configured to provide access for insertion of a tool at the vehicle upper side of the steering column for fixing the knee airbag module to the steering column.

2. The column-mounted knee airbag device of claim 1, wherein the column cover has a multi-part structure including a vehicle upper side upper cover, and a vehicle lower side lower cover, and the knee airbag module is attached to the vehicle lower side lower cover before fixing to the steering column.

3. The column-mounted knee airbag device of claim 1, wherein
one of an upper attachment bracket or a lower attachment bracket is provided at a steering column side;
the other of the upper attachment bracket or the lower attachment bracket is provided at a knee airbag module side;
in the fixing of the knee airbag module to the steering column, the upper attachment bracket and the lower attachment bracket are fixed to each other at corresponding fastening surfaces thereof, and
the fastening surface of the lower attachment bracket inclines towards a vehicle upper side and a vehicle rear side with respect to an axis line of the steering column.

4. The column-mounted knee airbag device of claim 3, wherein
the steering column includes a vehicle rear side portion to which the knee airbag module is fixed, and a vehicle front side portion, and is configured to collapse and absorb an impact, owing to the vehicle rear side portion and the vehicle front side portion moving relative to each other in an axial direction when a load equal to or greater than a predetermined load is input to the steering column along the axial direction thereof, and
the upper attachment bracket and the lower attachment bracket are disposed between the combination switch and the vehicle front side portion such that they do not interfere with the vehicle front side portion during the relative movement.

5. The column-mounted knee airbag device of claim 4, wherein:
the upper attachment bracket and the lower attachment bracket are provided at a vehicle width direction outer side of the steering column, such that they do not interfere with the vehicle front side portion when the vehicle front side portion and the vehicle rear side portion move relative to each other and the steering column completely collapses.

6. The column-mounted knee airbag device of claim 4, wherein:
the upper attachment bracket is provided at the knee airbag module side;
the lower attachment bracket is provided at the vehicle rear side portion of the steering column, and
an engaging portion is provided at the upper attachment bracket to engage with the lower attachment bracket when the fastening surface of the upper attachment bracket is superimposed on the fastening surface of the lower attachment bracket.

7. The column-mounted knee airbag device of claim 1, wherein the inflator is provided at a vehicle lower side of the steering column, along a direction that is at a right angle, or substantially at a right angle, to an axis line of the steering column.

8. The column-mounted knee airbag device of claim 7, wherein the inflator is arranged in the module case at a position offset towards a vehicle rear direction side.

9. The column-mounted knee airbag device of claim 1, wherein the inflator is arranged directly under, or substantially directly under, the steering column, in parallel, or substantially in parallel, with an axis line of the steering column.

10. The column-mounted knee airbag device of claim 1, wherein a first lower attachment bracket at a vehicle right side is offset further towards a front side in an axis line direction of the steering column than a second lower attachment bracket at a vehicle left side.

* * * * *